United States Patent
Toda et al.

(10) Patent No.: US 11,738,630 B2
(45) Date of Patent: Aug. 29, 2023

(54) VEHICLE IN-WHEEL DRIVE MOTOR AND A BODY SIDE DRIVE MOTOR

(71) Applicant: Mazda Motor Corporation, Hiroshima (JP)

(72) Inventors: Isao Toda, Hiroshima (JP); Seiyo Hirano, Hiroshima (JP); Kei Yonemori, Hiroshima (JP); Hideki Sanai, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 424 days.

(21) Appl. No.: 16/981,307

(22) PCT Filed: Mar. 19, 2019

(86) PCT No.: PCT/JP2019/011427
§ 371 (c)(1),
(2) Date: Sep. 16, 2020

(87) PCT Pub. No.: WO2019/181933
PCT Pub. Date: Sep. 26, 2019

(65) Prior Publication Data
US 2021/0016782 A1    Jan. 21, 2021

(30) Foreign Application Priority Data

Mar. 20, 2018  (JP) .................................. 2018-052636
Jul. 31, 2018   (JP) .................................. 2018-143353

(51) Int. Cl.
*B60K 1/02* (2006.01)
*B60K 1/04* (2019.01)
(Continued)

(52) U.S. Cl.
CPC .................. *B60K 1/04* (2013.01); *B60K 1/02* (2013.01); *B60K 6/24* (2013.01); *B60K 6/28* (2013.01);
(Continued)

(58) Field of Classification Search
CPC .. B60W 2540/10; B60W 40/08; B60W 10/08; H02K 7/006; B60K 7/0007; B60K 1/02
See application file for complete search history.

(56) References Cited

U.S. PATENT DOCUMENTS 6,007,451 A    12/1999  Matsui et al.
6,333,620 B1   12/2001  Schmitz et al.
(Continued)

FOREIGN PATENT DOCUMENTS

CN    107471995 A    12/2017
EP    2 682 963 A1    1/2014
(Continued)

OTHER PUBLICATIONS

Office Action dated Sep. 6, 2021, in corresponding Japanese patent Application No. 2018-143351, 8 pages.
(Continued)

*Primary Examiner* — Jason D Shanske
*Assistant Examiner* — James J Triggs
(74) *Attorney, Agent, or Firm* — XSENSUS LLP

(57) ABSTRACT

A vehicle drive device uses in-wheel motors to drive a vehicle and includes in-wheel motors that are provided in wheels of a vehicle and drive the wheels, a body side motor that is provided in a body of the vehicle and drives the wheels, and a controller that controls the in-wheel motors and the body side motor based on requested output power of a driver, in which the controller causes the body side motor to generate a driving force and the in-wheel motors not to generate driving forces when the requested output power of (Continued)

the driver is less than predetermined output power and the controller causes the body side motor and the in-wheel motors to generate driving forces when the requested output power of the driver is equal to or more than the predetermined output power.

8 Claims, 16 Drawing Sheets

(51) Int. Cl.

| | | |
|---|---|---|
| B60L 50/16 | (2019.01) | |
| B60K 6/24 | (2007.10) | |
| B60K 6/28 | (2007.10) | |
| B60K 6/44 | (2007.10) | |
| B60L 15/20 | (2006.01) | |
| B60W 20/20 | (2016.01) | |
| B60K 7/00 | (2006.01) | |
| H02K 7/00 | (2006.01) | |
| B60W 10/08 | (2006.01) | |
| B60W 40/08 | (2012.01) | |
| B60L 50/60 | (2019.01) | |
| B60K 6/40 | (2007.10) | |
| B60K 6/442 | (2007.10) | |
| B60K 6/52 | (2007.10) | |
| B60L 9/18 | (2006.01) | |
| B60L 50/61 | (2019.01) | |
| B60L 53/24 | (2019.01) | |
| B60L 50/40 | (2019.01) | |
| B60W 20/10 | (2016.01) | |
| B60K 6/26 | (2007.10) | |

(52) U.S. Cl.
CPC .................. *B60K 6/40* (2013.01); *B60K 6/44* (2013.01); *B60K 6/442* (2013.01); *B60K 6/52* (2013.01); *B60K 7/0007* (2013.01); *B60L 9/18* (2013.01); *B60L 15/20* (2013.01); *B60L 50/16* (2019.02); *B60L 50/40* (2019.02); *B60L 50/60* (2019.02); *B60L 50/61* (2019.02); *B60L 53/24* (2019.02); *B60W 10/08* (2013.01); *B60W 20/10* (2013.01); *B60W 20/20* (2013.01); *B60W 40/08* (2013.01); *H02K 7/006* (2013.01); *B60K 6/26* (2013.01); *B60K 2001/045* (2013.01); *B60K 2001/0405* (2013.01); *B60K 2001/0416* (2013.01); *B60K 2001/0438* (2013.01); *B60K 2007/0092* (2013.01); *B60W 2540/10* (2013.01); *B60Y 2200/92* (2013.01)

(56) References Cited

U.S. PATENT DOCUMENTS

| | | | |
|---|---|---|---|
| 7,649,335 B2 | 1/2010 | Ishikawa et al. | |
| 7,877,184 B2 | 1/2011 | Watanabe et al. | |
| 8,386,131 B2* | 2/2013 | Thaduvayi | B60T 7/122 |
| | | | 701/36 |
| 9,712,090 B2 | 7/2017 | Yamada et al. | |
| 9,789,871 B1 | 10/2017 | Dlala et al. | |
| 10,668,801 B2* | 6/2020 | von Koenigsegg | B60K 6/28 |
| 2004/0026158 A1* | 2/2004 | Rieth | B62D 5/0481 |
| | | | 180/405 |
| 2004/2006325 | 10/2004 | Momcilovich et al. | |
| 2005/0099155 A1 | 5/2005 | Okuda et al. | |
| 2006/0097579 A1 | 5/2006 | Okuda et al. | |
| 2006/0169506 A1 | 8/2006 | Handa et al. | |
| 2008/0197810 A1 | 8/2008 | Ishikawa et al. | |
| 2010/0133023 A1 | 6/2010 | Tang | |
| 2011/0083918 A1* | 4/2011 | Kshatriya | B60K 6/485 |
| | | | 903/903 |
| 2012/0143426 A1 | 6/2012 | Yamamoto et al. | |
| 2014/0084828 A1 | 3/2014 | Yamamoto | |
| 2014/0368041 A1 | 12/2014 | Tu et al. | |
| 2015/0210171 A1 | 7/2015 | King et al. | |
| 2018/0065491 A1 | 3/2018 | King et al. | |
| 2019/0381897 A1 | 12/2019 | King et al. | |
| 2020/0139825 A1 | 5/2020 | King et al. | |
| 2021/0178909 A1 | 6/2021 | King et al. | |

FOREIGN PATENT DOCUMENTS

| | | |
|---|---|---|
| FR | 2 976 889 A1 | 12/2012 |
| JP | 6-46508 A | 2/1994 |
| JP | H10-042406 A | 2/1998 |
| JP | 2001-231107 A | 8/2001 |
| JP | 2004-187412 A | 7/2004 |
| JP | 2005-178479 A | 7/2005 |
| JP | 2005-289182 A | 10/2005 |
| JP | 2005-289322 A | 10/2005 |
| JP | 2006-103535 A | 4/2006 |
| JP | 2006-158173 A | 6/2006 |
| JP | 2006-264474 A | 10/2006 |
| JP | 2006-345606 A | 12/2006 |
| JP | 2009-227051 A | 10/2009 |
| JP | 2009-268343 A | 11/2009 |
| JP | 2011-031744 A | 2/2011 |
| JP | 2011-110966 A | 6/2011 |
| JP | 2011-218914 A | 11/2011 |
| JP | 2012-066609 A | 4/2012 |
| JP | 2012-121375 A | 6/2012 |
| JP | 2013-153617 A | 8/2013 |
| JP | 2013-163436 A | 8/2013 |
| JP | 5280961 B2 | 9/2013 |
| JP | 2013-219942 A | 10/2013 |
| JP | 5605877 B1 | 10/2014 |
| JP | 2015-74293 A | 4/2015 |
| JP | 2015-142508 A | 8/2015 |
| KR | 10-1551120 B1 | 9/2015 |
| WO | 2004/066472 A1 | 8/2004 |
| WO | 2006/132052 A2 | 12/2006 |
| WO | 2012/006734 A1 | 1/2012 |
| WO | 2012/157036 A1 | 11/2012 |
| WO | 2017/122776 A1 | 7/2017 |

OTHER PUBLICATIONS

Office Action dated Mar. 28, 2022, in corresponding Japanese patent Application No. 2018-228129, 6 pages.
International Search Report and Written Opinion dated Jun. 11, 2019 for PCT/JP2019/011427 filed on Mar. 19, 2019, 9 pages including English Translation of the International Search Report.
Office Action dated Aug. 18, 2021, in corresponding Japanese patent Application No. 2018-158419, 13 pages.
Office Action dated Mar. 7, 2022, in corresponding Japanese patent Application No. 2018-143355, 7 pages.
Office Action dated Mar. 7, 2022, in corresponding Japanese patent Application No. 2018-143356, 7 pages.
Office Action dated Mar. 7, 2022, in corresponding Japanese patent Application No. 2018-143357, 7 pages.
Office Action dated Feb. 3, 2023, in corresponding Chinese patent Application No. 201980019078.9, 8 pages.
Office Action dated Feb. 3, 2023, in corresponding Chinese patent Application No. 201980019004.5, 8 pages.
International Search Report dated May 14, 2019 in International Patent Application No. PCT/JP2019/010907 with English Translation, 7 pages.
Extended European Search Report dated Mar. 11, 2021 in European Patent Application No. 19770753.2, 9 pages.
Extended European Search Report dated Mar. 15, 2021 in European Patent Application No. 19770754.0, 9 pages.
Extended European Search Report dated Mar. 12, 2021 in European Patent Application No. 19771573.3, 7 pages.
Extended European Search Report dated Mar. 22, 2021 in European Patent Application No. 19771793.7, 9 pages.

(56) References Cited

OTHER PUBLICATIONS

Extended European Search Report dated Mar. 26, 2021 in European Patent Application No. 19770515.5, 11 pages.
Office Action dated Dec. 27, 2021 in U.S. Appl. No. 16/980,869, 51 pages.
Office Action dated Jan. 19, 2022 in U.S. Appl. No. 16/981,288, 26 pages.
Office Action dated Jan. 30, 2023 in U.S. Appl. No. 16/981,292, 70 pages.
Office Action dated Feb. 17, 2023 in Chinese Patent Application No. 201980019047.3, 10 pages.

\* cited by examiner

VEHICLE IN-WHEEL DRIVE MOTOR AND A BODY SIDE DRIVE MOTOR

CROSS-REFERENCE TO RELATED APPLICATIONS

The present application is based on PCT filing PCT/JP2019/011427, filed Mar. 19, 2019, which claims priority to JP 2018-052636, filed Mar. 20, 2018, and JP 2018-143353, filed Jul. 31, 2018, the entire contents of each are incorporated herein by reference.

TECHNICAL FIELD

The present invention relates to a vehicle drive device and, more particularly, to a vehicle drive device that uses in-wheel motors to drive a vehicle.

BACKGROUND ART

In recent years, exhaust gas regulations for vehicles have been enhanced and demands for fuel efficiency and carbon dioxide emissions per travel distance for vehicles have become strict in various countries in the world. In addition, some cities regulate entry of vehicles traveling by an internal combustion engine into urban areas. To satisfy these requests, hybrid-drive vehicles having an internal combustion engine and motors and electric vehicles driven only by motors have been developed and widely used.

Japanese Patent No. 5280961 (PTL 1) describes a drive control device for vehicles. In this drive control device, a drive device is provided on the rear wheel side of the vehicle and two motors provided in this drive device drive the rear wheels of the vehicle, respectively. In addition to this drive device, a drive unit formed by connecting an internal combustion engine and a motor that are in series is provided in the front portion of the vehicle. The power of the drive unit is transmitted to the front wheels via the transmission and the main drive shaft and the power of the drive device is transmitted to the rear wheels of the vehicle. In addition, in this drive control device, the two motors of the drive device are driven when the vehicle starts, and these driving forces are transmitted to the rear wheels of the vehicle, respectively. In addition, the driving unit also generates a driving force during acceleration of the vehicle and the four-wheel drive is achieved by the driving unit and the two motors of the drive device. As described above, in the drive control device described in PTL 1, the two motors provided mainly for the rear wheels of the vehicle generate the driving forces.

CITATION LIST

Patent Literature

PTL 1: Japanese Patent No. 5280961

SUMMARY OF INVENTION

Technical Problem

Since the driving of a vehicle by motors does not emit carbon dioxide during a travel, emission regulations that are enhanced each year can be advantageously satisfied, but it is difficult to ensure a sufficiently long distance travel because the electric power that can be stored in the battery is limited. Accordingly, a hybrid drive device having an internal combustion engine together with motors is widely used as a drive device for vehicles. In addition, even in such a hybrid drive device, in order to reduce carbon dioxide emissions during a travel, vehicles that mainly utilize the driving forces of motors like the vehicle described in PTL 1 are increasing.

Such a hybrid drive device driven mainly by the driving forces of motors as described above needs to have a large capacity battery to obtain sufficient travel performance. In addition, in order to obtain a sufficient driving forces by motors, the motors need to be operated at a relatively high voltage. Accordingly, in a hybrid drive device driven mainly by the driving forces of motors, since a large capacity battery is necessary and the electrical system that supplies a high voltage to the motors needs to be electrically insulated sufficiently, the overall weight of the vehicle increases and the fuel efficiency of the vehicle reduces. Furthermore, in order to drive the vehicle with a heavy weight by the motors, a larger capacity battery and a higher voltage are required, thereby causing a vicious cycle that further increases the weight.

In addition, in the drive control device of the vehicle described in PTL 1, the motors that drive the rear wheels are directly connected to the drive shafts of the rear wheels, but the motors may be built into the rear wheels to form so-called in-wheel motors. Since the drive shafts that couple the motors and the wheels are not required when using in-wheel motors, it is advantageous in that the weight of the drive shafts can be reduced. However, even when the in-wheel motors are adopted as the motors for startup, acceleration, and cruise travel of the vehicle as in the invention described in PTL 1, an increase in weight cannot be avoided because large motors are required to obtain sufficient travel performance. Accordingly, the advantage of using in-wheel motors cannot be obtained sufficiently.

Accordingly, an object of the present invention is to provide a vehicle drive device capable of efficiently driving a vehicle by using in-wheel motors without falling into the vicious cycle between enhancement of driving by motors and an increase in vehicle weight.

Solution to Problem

To solve the problem described above, according to the present invention, there is provided a vehicle drive device that uses an in-wheel motor to drive a vehicle, the vehicle drive device including an in-wheel motor that is provided in a wheel of the vehicle and drives the wheel; a body side motor that is provided in a body of the vehicle and drives the wheel; and a controller that controls the in-wheel motor and the body side motor based on requested output power of a driver, in which the controller causes the body side motor to generate a driving force and the in-wheel motor not to generate a driving force when the requested output power of the driver is less than predetermined output power, and the controller causes the body side motor and the in-wheel motor to generate driving forces when the requested output power of the driver is equal to or more than the predetermined output power.

In the present invention configured as described above, the controller controls the in-wheel motor that is provided in the wheel and drives the wheel based on the requested output power of the driver. In addition, when the requested output power of the driver is less than the predetermined output power, the controller causes the body side motor to generate a driving force and the in-wheel motor not to generate a driving force. Furthermore, when the requested output power of the driver is equal to or more than the predetermined output power, the controller causes the body side motor and the in-wheel motor to generate driving forces.

Accordingly, in the present invention, since the body side motor and the in-wheel motor generate driving forces when the requested output power of the driver is equal to or more than the predetermined output power, the in-wheel motor is not requested for large output power. As a result, since a small motor with small output power may be adopted as the in-wheel motor, the vehicle can be efficiently driven using the in-wheel motor.

In the present invention, preferably, the vehicle drive device further includes an accelerator position sensor that detects an amount of depression of an accelerator pedal of the vehicle, in which the controller sets the requested output power of the driver based on the amount of depression of the accelerator pedal detected by the accelerator position sensor, and the requested output power of the driver when the amount of depression of the accelerator pedal is large is set larger than the requested output power of the driver when the amount of depression of the accelerator pedal is small.

In the present invention configured as described above, since the requested output power of the driver is set to a large value when the amount of depression of the accelerator pedal is large, the intention of the driver can be more accurately reflected in the requested output power.

In the present invention, preferably, the in-wheel motor directly drives the wheel in which the in-wheel motor is provided without intervention of a deceleration mechanism.

In the present invention, since the in-wheel motor and the body side motor generate driving forces when the requested output power is equal to or more than the predetermined output power, the in-wheel motor is not requested for a large torque in the low speed range. Accordingly, the in-wheel motor can generate a sufficient torque in the rotation range in which the torque is requested without providing the deceleration mechanism. In addition, in the present invention configured as described above, since the wheel is directly driven without intervention of the deceleration mechanism, the deceleration mechanism with very heavy weight can be omitted and the output loss due to the rotation resistance of the deceleration mechanism can be avoided.

In the present invention, preferably, the in-wheel motor is an induction motor.

Generally, an induction motor can obtain a large output torque in the high rotation range and the weight thereof can be reduced. Accordingly, by adopting an induction motor as the in-wheel motor that is not requested for a large torque in the low rotation range in the present invention, the weight of a motor capable of generating a sufficient torque in the required rotation range can be reduced.

In the present invention, preferably, the body side motor is a permanent magnet motor.

Generally, a permanent magnet motor has a relatively large starting torque and can obtain a large torque in the low rotation range. Accordingly, by adopting a permanent magnet motor as the body side motor that is requested for a large torque in the low rotation range in the present invention, the weight of a motor capable of generating a sufficient torque in the required rotation range can be reduced.

In the present invention, preferably, the wheel driven by the in-wheel motor is a front wheel of the vehicle and the wheel driven by the body side motor is a rear wheel of the vehicle.

In the present invention, preferably, the wheel driven by the in-wheel motor is a rear wheel of the vehicle and the wheel driven by the body side motor is a front wheel of the vehicle.

In the present invention, preferably, the wheel driven by the in-wheel motor and the body side motor is a front wheel of the vehicle.

In the present invention, preferably, the wheel driven by the in-wheel motor and the body side motor is a rear wheel of the vehicle.

Advantageous Effects of Invention

The hybrid drive device according to the present invention can efficiently drive a vehicle using an in-wheel motor without causing the vicious cycle between enhancement of driving by a motor and an increase in vehicle weight.

DESCRIPTION OF EMBODIMENTS

Next, preferred embodiments of the present invention will be described with reference to the attached drawings.

Figure 1:
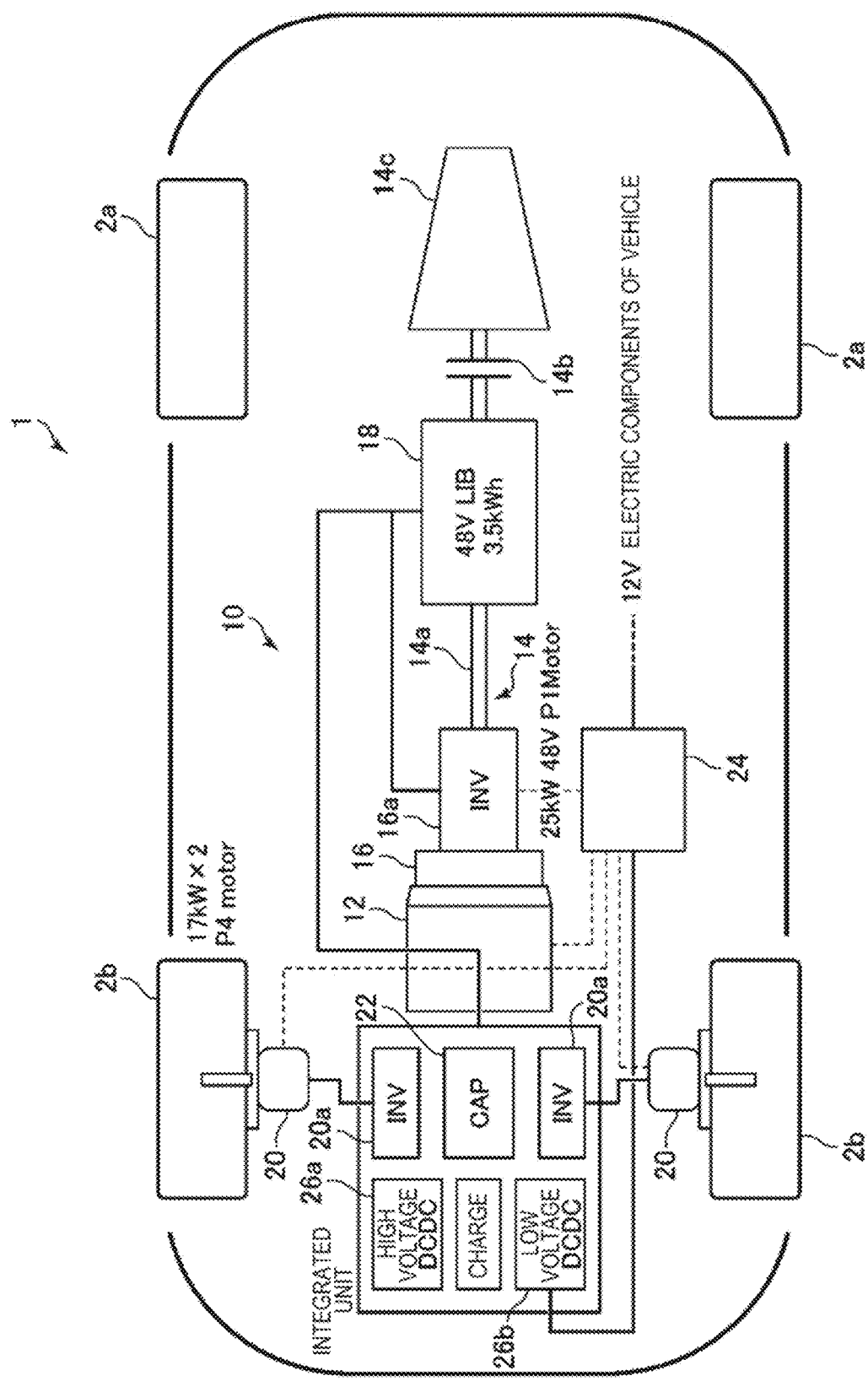
FIG. 1 is a layout diagram illustrating a vehicle in which a hybrid drive device according to a first embodiment of the present invention is installed.
Figure 2:
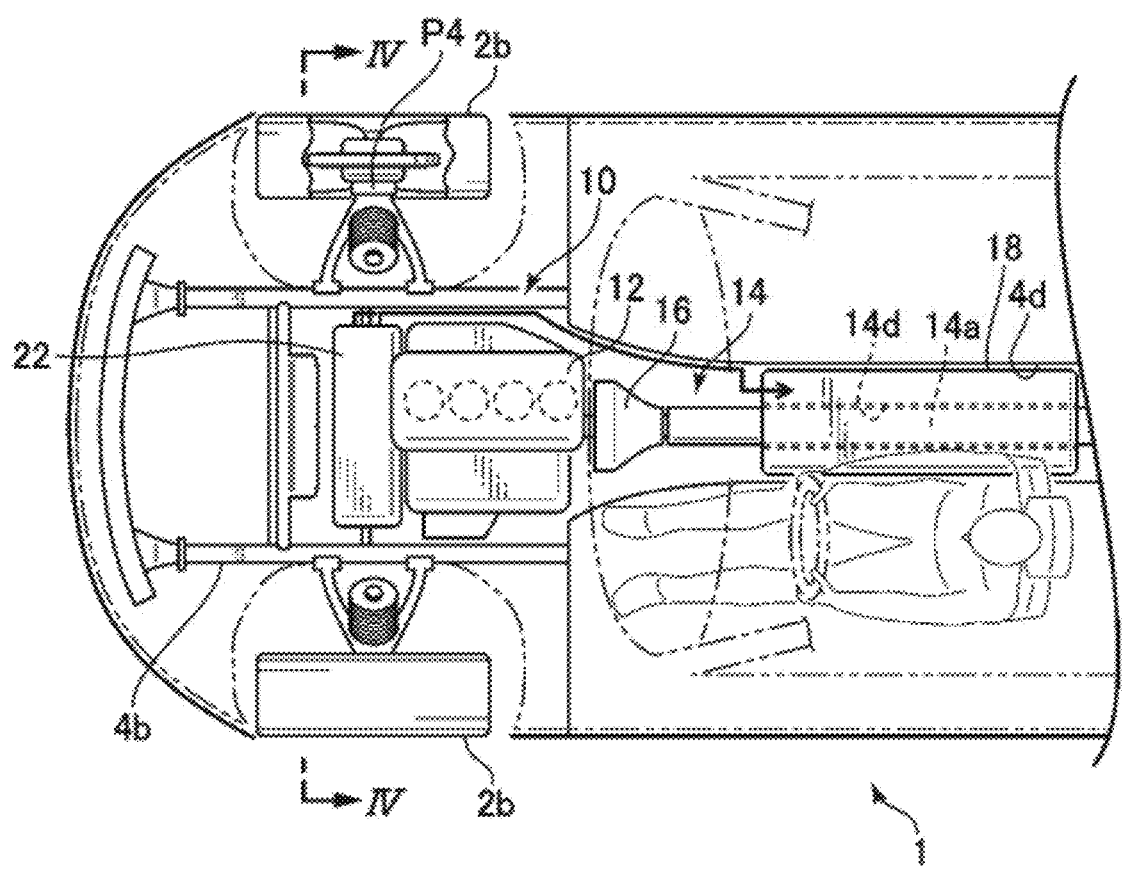
FIG. 2 is a perspective view, as seen from above, illustrating a front portion of the vehicle in which the hybrid drive device according to the first embodiment of the present invention is installed.
Figure 3:
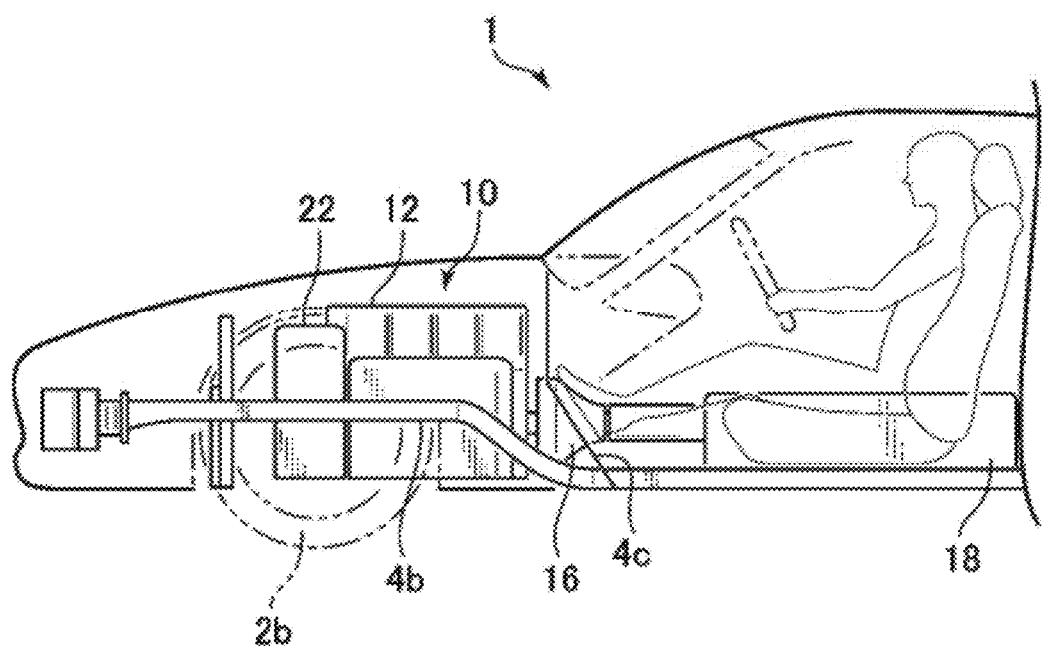
FIG. 3 is a perspective view, as seen from the side, illustrating the front portion of the vehicle in which the hybrid drive device according to the first embodiment of the present invention is installed.
Figure 4:
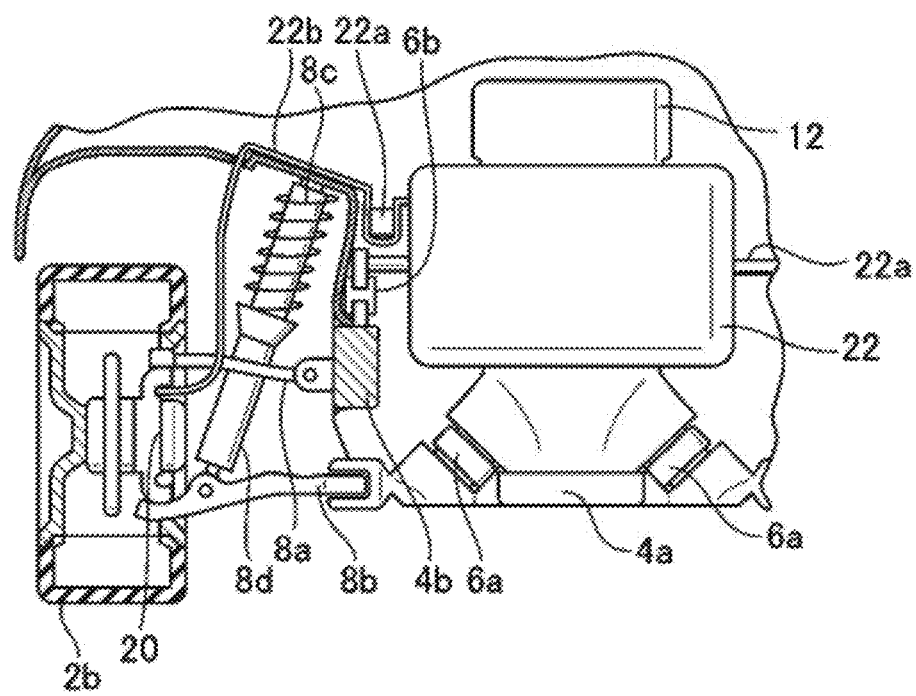
FIG. 4 is a sectional view taken along line iv-iv in FIG. 2.

FIG. 1 is a layout diagram illustrating a vehicle in which a hybrid drive device according to a first embodiment of the present invention is installed. FIG. 2 is a perspective view, as seen from the side, illustrating the front portion of a vehicle in which the hybrid drive device according to the embodiment is installed and FIG. 3 is a perspective view, as seen from the side, illustrating the front portion of the vehicle. FIG. 4 is a sectional view taken along line iv-iv in FIG. 2.

As illustrated in FIG. 1, a vehicle 1 having the hybrid drive system, which is a vehicle drive device according to the first embodiment of the present invention, is a so-called FR (front engine rear drive) vehicle in which an engine 12 as an internal combustion engine is installed in the front portion (in front of the driver's seat) of the vehicle and a pair of left and right rear wheels 2a as main drive wheels is driven. In addition, as described later, the rear wheels 2a are also driven by the main drive motor, which is the main drive electric motor, and a pair of left and right front wheels 2b which are auxiliary drive wheels, is driven by the auxiliary drive motors, which are the auxiliary drive electric motors.

A hybrid drive device 10 according to the first embodiment of the present invention installed in the vehicle 1 includes the engine 12 that drives the rear wheels 2a, a power transmission mechanism 14 that transmits a driving force to the rear wheels 2a, a main drive motor 16 that drives the rear wheels 2a, a battery 18 that is an electric storage unit, auxiliary drive motors 20 that drive the front wheels 2b, a capacitor 22, and a control device 24 that is a controller.

The engine 12 is an internal combustion engine for generating a driving force for the rear wheels 2a, which are the main drive wheels of the vehicle 1. As illustrated in FIGS. 2 to 4, in the embodiment, an in-line 4-cylinder engine is adopted as the engine 12 and the engine 12 disposed in the front portion of the vehicle 1 drives the rear wheels 2a via the power transmission mechanism 14. In addition, as illustrated in FIG. 4, in the embodiment, the engine 12 is a flywheel-less engine that does not include a flywheel and installed on a subframe 4a of the vehicle 1 via engine mounts 6a. Furthermore, the sub-frame 4a is fastened and fixed to the lower portions of front side frames 4b and the lower portion of a dash panel 4c at the rear ends thereof.

The power transmission mechanism 14 is configured to transmit the driving force generated by the engine 12 to the rear wheels 2a, which are the main drive wheels. As illustrated in FIG. 1 to FIG. 3, the power transmission mechanism 14 includes a propeller shaft 14a connected to the engine 12, a clutch 14b, and a transmission 14c, which is a stepped transmission. The propeller shaft 14a extends from the engine 12 disposed in the front portion of the vehicle 1 toward the rear of the vehicle 1 in a propeller shaft tunnel 4d (FIG. 2). The rear end of the propeller shaft 14a is connected to the transmission 14c via the clutch 14b. The output shaft of the transmission 14c is connected to the axle shaft (not illustrated) of the rear wheels 2a and drives the rear wheels 2a.

In the embodiment, the transmission 14c is provided in so-called transaxle arrangement. As a result, since the main body of the transmission with a large outer diameter is not present immediately behind the engine 12, the width of the floor tunnel (propeller shaft tunnel 4d) can be reduced, the foot space in the middle of the occupant can be obtained, and the lower body of the occupant can take a symmetrical posture that faces directly the front. Furthermore, the outer diameter and the length of the main drive motor 16 can easily have sufficient sizes according to the output power thereof while keeping this posture of the occupant.

The main drive motor 16 is an electric motor for generating a driving force for the main drive wheels, provided on the body of the vehicle 1, disposed behind the engine 12 adjacently to the engine 12, and functions as a body side motor. In addition, an inverter (INV) 16a is disposed adjacently to the main drive motor 16 and the inverter 16a converts the current from the battery 18 into alternating current and supplies the alternating current to the main drive motor 16. Furthermore, as illustrated in FIG. 2 and FIG. 3, the main drive motor 16 is connected in series to the engine 12 and the driving force generated by the main drive motor 16 is also transmitted to the rear wheels 2a via the power transmission mechanism 14. Alternatively, the present invention may be configured so that the driving force is transmitted to the rear wheels 2a via a part of the power transmission mechanism 14 by connecting the main drive motor 16 to an intermediate point of the power transmission mechanism 14. In addition, the embodiment adopts, as the main drive motor 16, a 25 kW permanent magnet motor (permanent magnet synchronous motor) driven by 48 V.

The battery 18 is an electric storage unit that stores electric power for mainly operating the main drive motor 16. In addition, as illustrated in FIG. 2, the battery 18 is disposed inside the propeller shaft tunnel 4d so as to surround the torque tube 14d that covers the propeller shaft 14a in the embodiment. Furthermore, in the embodiment, a 48 V 3.5 kWh lithium ion battery (LIB) is used as the battery 18.

Since the transaxle arrangement is adopted in the embodiment as described above, the volume for accommodating the battery 18 can be expanded toward the space in front of the floor tunnel (propeller shaft tunnel 4d) created by this arrangement. This can obtain and expand the capacity of the battery 18 without reducing the space in the middle of the occupant by increasing the width of the floor tunnel.

As illustrated in FIG. 4, the auxiliary drive motors 20 are provided in the front wheels 2b under the springs of the vehicle 1 so as to generate driving forces for the front wheels 2b, which are the auxiliary drive wheels. In the embodiment, the front wheel 2b is supported by a double wishbone type suspension and is suspended by an upper arm 8a, a lower arm 8b, a spring 8c, and a shock absorber 8d. The auxiliary drive motors 20 are in-wheel motors and are housed in the wheels of the front wheels 2b. Accordingly, the auxiliary drive motors 20 are provided in the so-called "under-spring portions" of the vehicle 1 so as to drive the front wheels 2b. In addition, as illustrated in FIG. 1, the current from the capacitor (CAP) 22 is converted into alternating current by inverters 20a and supplied to the auxiliary drive motors 20. Furthermore, in the embodiment, the auxiliary drive motors 20 are not provided with deceleration machines that are deceleration mechanisms, the driving forces of the auxiliary drive motors 20 are directly transmitted to the front wheels 2b, and the wheels are directly driven. In addition, in the embodiment, 17 kW induction motors are adopted as the auxiliary drive motors 20.

The capacitor (CAP) 22 is provided so as to store the electric power regenerated by the auxiliary drive motors 20. As illustrated in FIG. 2 and FIG. 3, the capacitor 22 is disposed immediately in front of the engine 12 and supplies electric power to the auxiliary drive motors 20 provided in the front wheels 2b of the vehicle 1. As illustrated in FIG. 4, in the capacitor 22, brackets 22a projecting from both side surfaces thereof are supported by the front side frames 4b via a capacitor mount 6b. In addition, a harness 22b extending from the auxiliary drive motor 20 to the capacitor 22 passes through the upper end of the side wall of the wheel house and is led to the engine room. In addition, the capacitor 22 is configured to store electric charge at a voltage higher than in the battery 18 and is disposed in a region between the left and right front wheels 2b, which are the auxiliary drive wheels. The auxiliary drive motors 20, which are driven mainly by the electric power stored in the capacitor 22, are driven by a voltage higher than in the main drive motor 16.

The control device 24 controls the engine 12, the main drive motor 16, and the auxiliary drive motors 20 to execute a motor travel mode and an internal combustion engine travel mode. Specifically, the control device 24 can include a microprocessor, a memory, an interface circuit, a program for operating these components (these components are not illustrated), and the like. Details on control by the control device 24 will be described later.

In addition, as illustrated in FIG. 1, a high voltage DC/DC converter 26a and a low voltage DC/DC converter 26b, which are voltage converting units, are disposed near the capacitor 22. The high voltage DC/DC converter 26a, the low voltage DC/DC converter 26b, the capacitor 22, and the two inverters 20a are unitized to form an integrated unit.

Next, the overall structure, the power supply structure, and the driving of the vehicle 1 by the individual motors in the hybrid drive device 10 according to the first embodiment of the present invention will be described with reference to FIG. 5 to FIG. 8.

Figure 5:
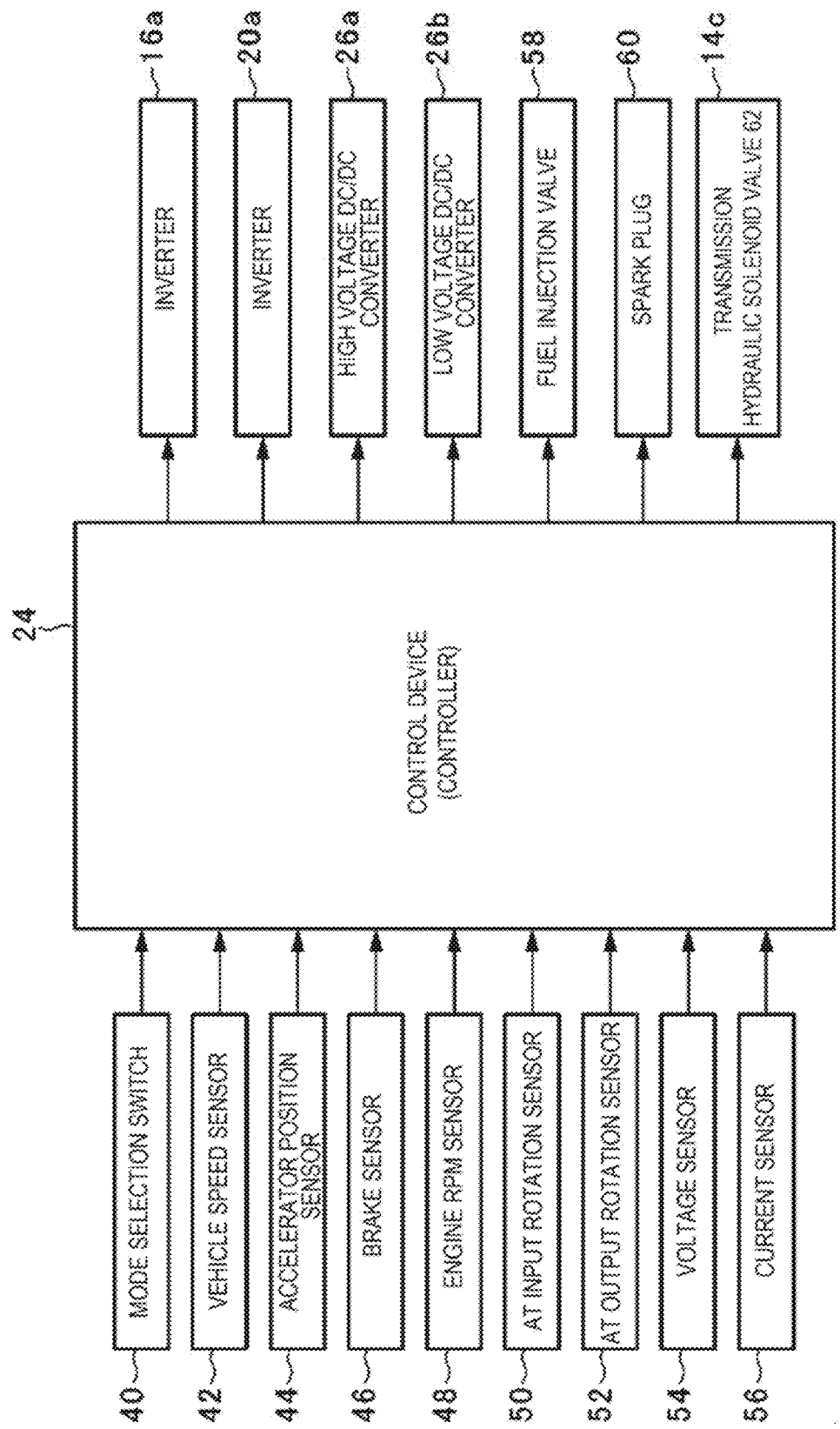
FIG. 5 is a block diagram illustrating the inputs and outputs of various signals in the hybrid drive device according to the first embodiment of the present invention.
Figure 6:
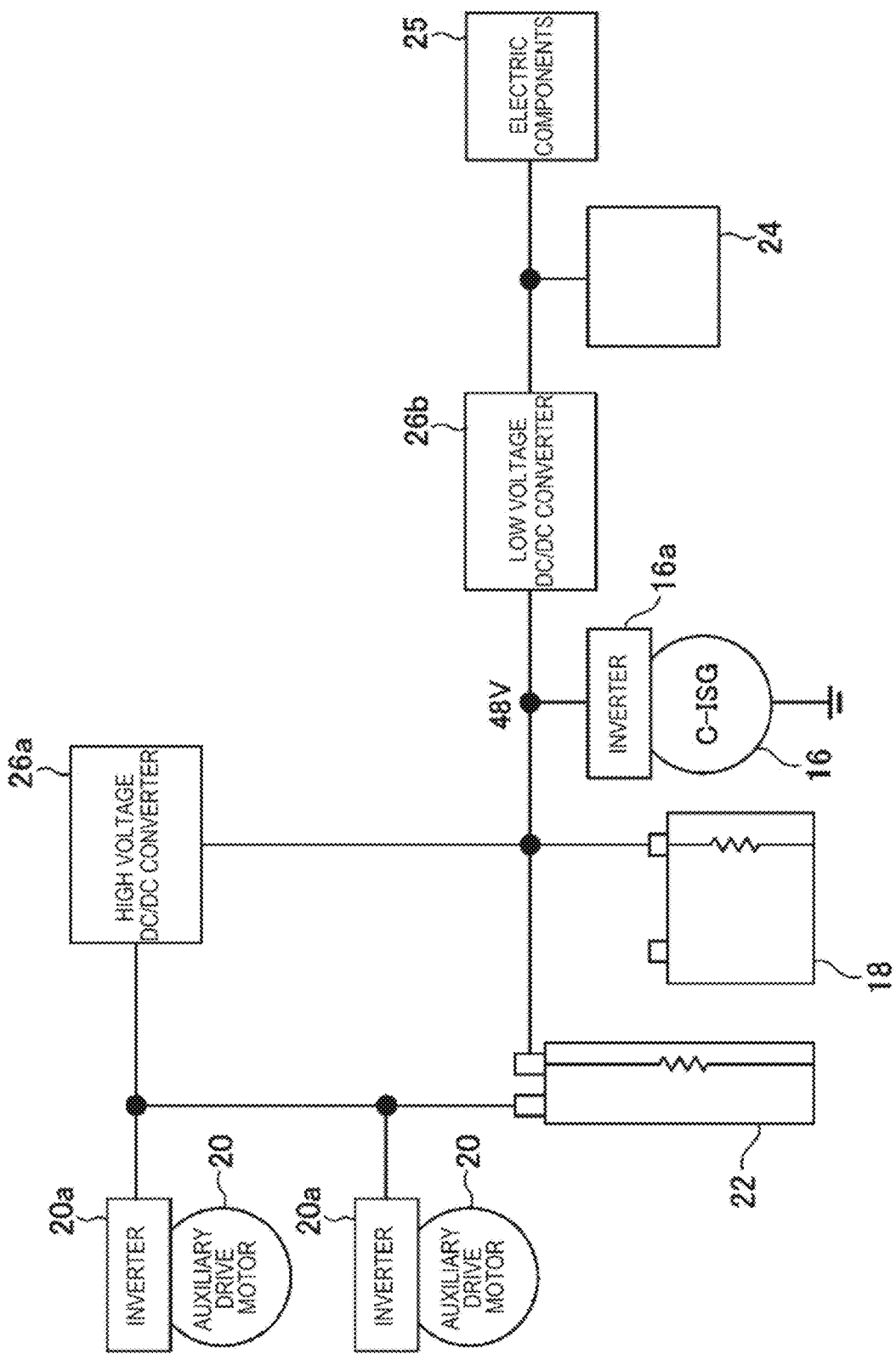
FIG. 6 is a block diagram illustrating the power supply structure of the hybrid drive device according to the first embodiment of the present invention.
Figure 7:
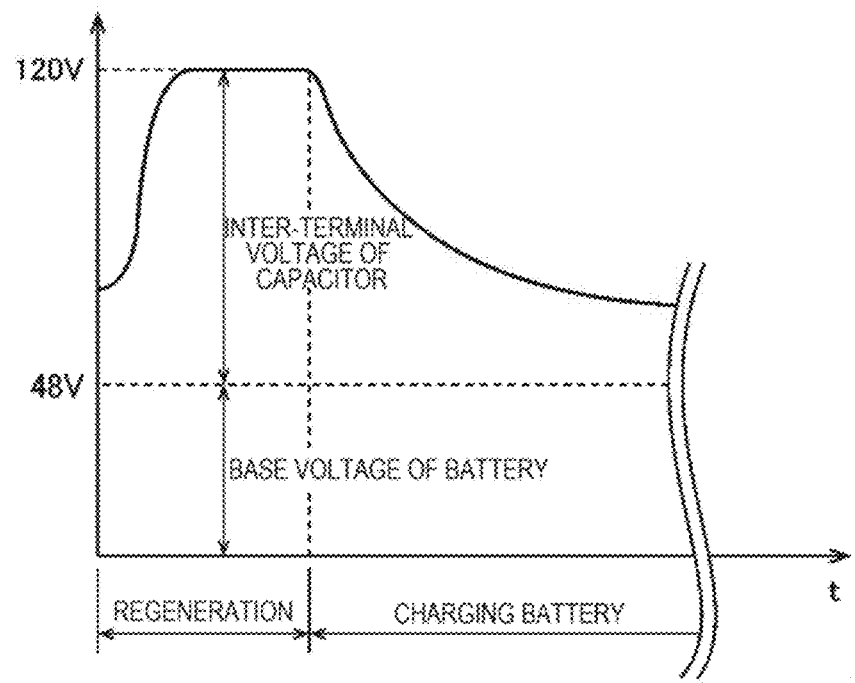
FIG. 7 is a diagram schematically illustrating one example of changes in voltages when electric power is regenerated into a capacitor in the hybrid drive device according to the first embodiment of the present invention.
Figure 8:
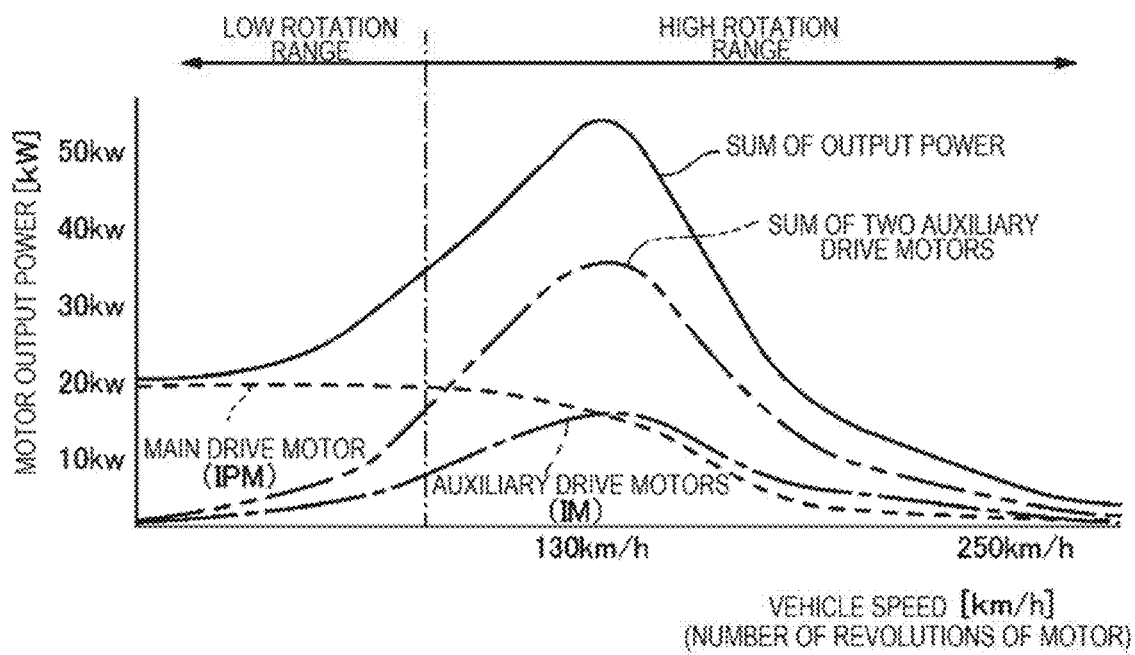
FIG. 8 is a diagram illustrating the relationship between the output power and the vehicle speed of individual motors used in the hybrid drive device according to the first embodiment of the present invention.

FIG. 5 is a block diagram illustrating the inputs and outputs of various signals in the hybrid drive device 10 according to the first embodiment of the present invention. FIG. 6 is a block diagram illustrating the power supply structure of the hybrid drive device 10 according to the first embodiment of the present invention. FIG. 7 is a diagram schematically illustrating one example of changes in voltages when electric power is regenerated into the capacitor 22 in the hybrid drive device 10 according to the embodiment. FIG. 8 is a diagram illustrating the relationship between the output power of the motors used in the hybrid drive device 10 according to the embodiment and the vehicle speed.

First, the inputs and outputs of various signals in the hybrid drive device 10 according to the first embodiment of the present invention will be described. As illustrated in FIG. 5, the control device 24 receives the detection signals detected by a mode selection switch 40, a vehicle speed sensor 42, an accelerator position sensor 44, a brake sensor 46, an engine RPM sensor 48, an automatic transmission (AT) input rotation sensor 50, an automatic transmission (AT) output rotation sensor 52, a voltage sensor 54, and a current sensor 56. In addition, the control device 24 controls the inverter 16a for the main drive motor, the inverters 20a for the auxiliary drive motors 20, the high voltage DC/DC converter 26a, the low voltage DC/DC converter 26b, a fuel injection valve 58, a spark plug 60, and a hydraulic solenoid valve 62 of the transmission 14c by control signals to these components.

Next, the power supply structure of the hybrid drive device 10 according to the first embodiment of the present invention will be described. As illustrated in FIG. 6, the battery 18 and capacitor 22 included in the hybrid drive device 10 are connected in series to each other. The main drive motor 16 is driven by approximately 48 V, which is the reference output voltage of the battery 18, and the auxiliary drive motors 20 are driven by a maximum voltage of 120 V, which is higher than the sum of the output voltage of the battery 18 and the inter-terminal voltage of the capacitor 22. Therefore, the auxiliary drive motors 20 are always driven by the electric power supplied via the capacitor 22.

In addition, the inverter 16a is mounted to the main drive motor 16 and converts the output of the battery 18 into alternating current through which the main drive motor 16, which is a permanent magnet motor, is driven. Similarly, the inverters 20a are mounted to the auxiliary drive motors 20 and convert the outputs of the battery 18 and the capacitor 22 into alternating current through which the auxiliary drive motors 20, which are induction motors, are driven. Since the auxiliary drive motors 20 are driven by a voltage higher than in the main drive motor 16, the harness (electric wires) 22b that supplies electric power to the auxiliary drive motors 20 needs to have high insulation. However, since the capacitor 22 is disposed close to the auxiliary drive motors 20, an increase in the weight due to high insulation of the harnesses 22b can be minimized.

Furthermore, when, for example, the vehicle 1 decelerates, the main drive motor 16 and the auxiliary drive motors 20 function as generators and generate electric power by regenerating the kinetic energy of the vehicle 1. The electric power regenerated by the main drive motor 16 is stored in the battery 18 and the electric power regenerated by the auxiliary drive motors 20 is stored mainly in the capacitor 22.

In addition, the high voltage DC/DC converter 26a, which is a voltage converting unit, is connected between the battery 18 and the capacitor 22 and this high voltage DC/DC converter 26a charges the capacitor 22 by raising the voltage of the battery 1g when the electric charge stored in the capacitor 22 is insufficient (when the inter-terminal voltage of the capacitor 22 drops). In contrast, when the inter-terminal voltage of the capacitor 22 rises to a predetermined voltage or higher due to regeneration of energy by the auxiliary drive motors 20, the battery 18 is charged by reducing the electric charge stored in the capacitor 22 and applying the electric charge to the battery 18. That is, the electric power regenerated by the auxiliary drive motors 20 is stored in the capacitor 22, and then the battery 18 is charged with a part of the stored electric charge via the high voltage DC/DC converter 26a.

Furthermore, the low voltage DC/DC converter 26b is connected between the battery 18 and 12V electric components 25 of the vehicle 1. Since many of the control device 24 of the hybrid drive device 10 and the electric components 25 of the vehicle 1 operate at a voltage of 12V, the voltage of the electric charge stored in the battery 18 is reduced to 12V by the low voltage DC/DC converter 26b and supplied to these devices.

Next, charging and discharging of the capacitor 22 will be described with reference to FIG. 7.

As illustrated in FIG. 7, the voltage of the capacitor 22 is the sum of the base voltage of the battery 18 and the inter-terminal voltage of the capacitor 22 itself. When, for example, the vehicle 1 decelerates, the auxiliary drive motors 20 regenerate electric power and the capacitor 22 is charged with the regenerated electric power. When the capacitor 22 is charged, the inter-terminal voltage rises relatively rapidly. When the inter-terminal voltage of the capacitor 22 rises to a predetermined voltage or more due to the charging, the voltage of the capacitor 22 is reduced by the high voltage DC/DC converter 26a and the battery 18 is charged. As illustrated in FIG. 7, the charging to the battery 18 from the capacitor 22 is performed relatively slowly than the charging to the capacitor 22 and the voltage of the capacitor 22 drops to a proper voltage relatively slowly.

That is, the electric power regenerated by the auxiliary drive motors 20 is temporarily stored in the capacitor 22 and then the battery 18 is slowly charged with the regenerated electric power. Depending on the time when the regeneration is performed, the regeneration of electric power by the auxiliary drive motors 20 may overlap with the charging from the capacitor 22 to the battery 18.

In contrast, the battery 18 is directly charged with the electric power regenerated by the main drive motor 16.

Next, the relationship between the vehicle speed and the output power of the motors in the hybrid drive device 10 according to the first embodiment of the present invention will be described with reference to FIG. 8. FIG. 8 is a graph illustrating the relationship between the speed of the vehicle 1 and the output power of the motors in the hybrid drive device 10 according to the embodiment. In FIG. 8, the output power of the main drive motor 16 is represented by a dotted line, the output power of one of the auxiliary drive motors 20 is represented by a dot-dash line, the sum of the output power of the two auxiliary drive motors 20 is represented by a dot-dot-dash line, and the sum of the output power of all motors is represented by a solid line. Although FIG. 8 illustrates the speed of the vehicle 1 on the horizontal axis and the output power of the motors on the vertical axis, since there is a certain relationship between the speed of the vehicle 1 and the number of revolutions of each of the motors, the output power of the motors draws curves similar to those in FIG. 8 even when the number of revolutions of each of the motors is represented on the horizontal axis.

Since a permanent magnet motor is adopted as the main drive motor 16 in the embodiment, as represented by the dotted line in FIG. 8, the output power of the main drive motor 16 is large in a low vehicle speed range in which the number of revolutions of the motor is low and the motor output power that can be output reduces as the vehicle speed increases. That is, in the embodiment, the main drive motor 16 is driven by approximately 48 V, outputs a torque (maximum torque) of approximately 200 Nm up to approximately 1000 rpm, and the torque reduces with the increase in the number of revolutions at approximately 1000 rpm or more. In addition, in the embodiment, the main drive motor 16 is configured to obtain a continuous output power of approximately 20 kW and a maximum output power of approximately 25 kW in the lowest low speed range.

In contrast, since induction motors are used as the auxiliary drive motors 20, the output power of the auxiliary drive motors 20 is very small in the low vehicle speed range, the motor outputs increase as the speed becomes higher, the maximum output power is obtained at a vehicle speed close to 130 km/h or so, and then the motor output power reduces, as represented by the dot-dash line and the dot-dot-dash line in FIG. 8. In the embodiment, the auxiliary drive motors 20 are driven by approximately 120 V. and each of them obtains an output power of approximately 17 kW and the two motors obtain a total output power of approximately 34 kW at a vehicle speed close to 130 km/h or so. That is, in the embodiment, each of the auxiliary drive motors 20 has a peak of the torque curve and obtains a maximum torque of approximately 200 Nm at approximately 600 to 800 rpm.

The solid line in FIG. 8 represents the sum of the output power of the main drive motor 16 and the two auxiliary drive motors 20. As is clear from this graph, in the embodiment, a maximum output power of approximately 53 kW is obtained at a vehicle speed close to 130 km/h or so and the travel condition requested in the WLTP test at this vehicle speed is satisfied at this maximum output power. In addition, although the output power values of the two auxiliary drive motors 20 are summed up even in the low vehicle speed range as represented by the solid line in FIG. 8, the auxiliary drive motors 20 are actually not driven in the low vehicle speed range as described later. That is, the vehicle is driven only by the main drive motor 16 at startup and in a low vehicle speed range and the two auxiliary drive motors 20 generate output power only when large output power is required in the high vehicle speed range (for example, when the vehicle 1 is accelerated in the high vehicle speed range). By using the induction motors (auxiliary drive motors 20) capable of generating large output power in the high rotation range only in the high speed range as described above, sufficient output power can be obtained when necessary (for example, when acceleration at a predetermined speed or more is performed) while an increase in vehicle weight is kept low.

Figure 9:
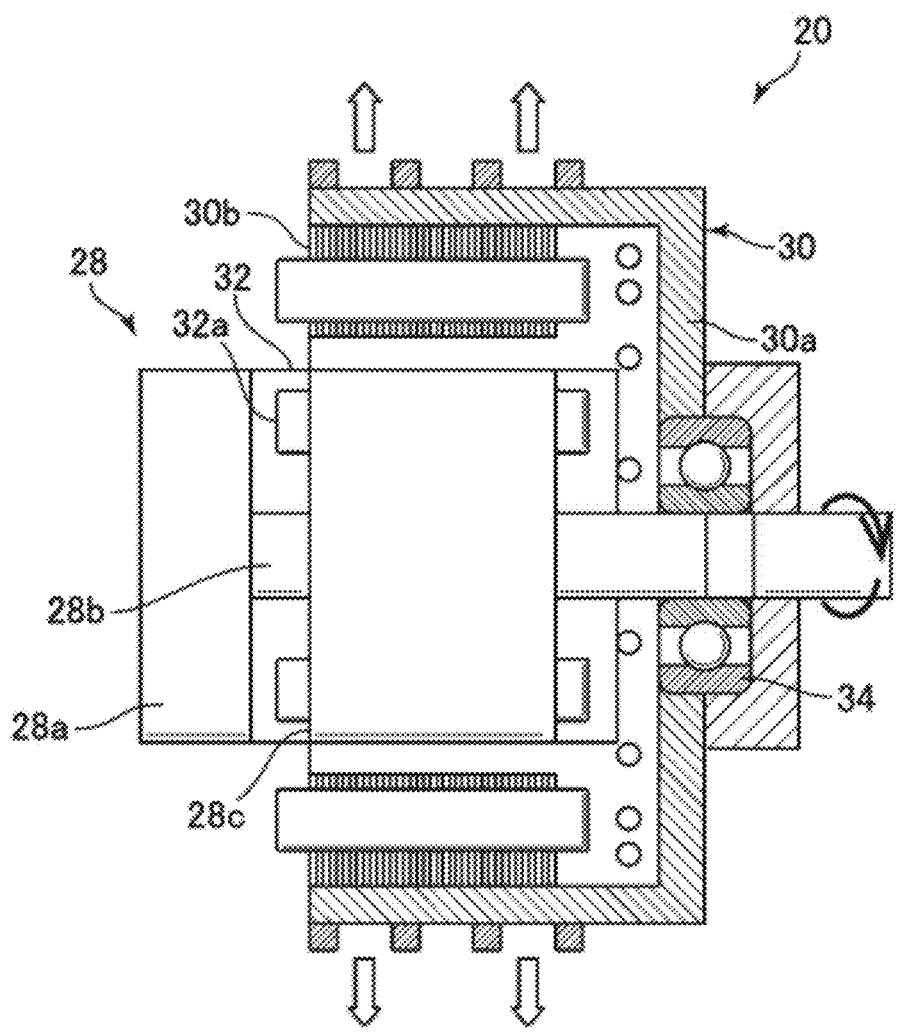
FIG. 9 is a sectional view schematically illustrating the structure of an auxiliary drive motor adopted in the hybrid drive device according to the first embodiment of the present invention.

Next, the structure of the auxiliary drive motors 20 adopted in the hybrid drive device 10 according to the first embodiment of the present invention will be described with reference to FIG. 9. FIG. 9 is a sectional view schematically illustrating the structure of the auxiliary drive motor 20.

As illustrated in FIG. 9, the auxiliary drive motor 20 is an outer rotor type induction motor including a stator 28 and a rotor 30 that rotates around this stator.

The stator 28 includes a substantially discoid stator base 28a, a stator shaft 28b extending from the center of the stator base 28a, and a stator coil 28c attached around the stator shaft 28b. In addition, the stator coil 28c is housed in an electrical insulating liquid chamber 32, immersed in electrical insulating liquid 32a that fills the electrical insulating liquid chamber, and subject to boiling cooling via the liquid.

The rotor 30 is formed in a substantially cylindrical shape so as to surround the periphery of the stator 28 and has a substantially cylindrical rotor body 30a with one end closed and a rotor coil 30b disposed on the inner peripheral wall surface of the rotor body 30a. The rotor coil 30b is disposed facing the stator coil 28c so as to generate induction current by the rotational magnetic field generated by the stator coil 28c. In addition, the rotor 30 is supported by a bearing 34 attached to the end of the stator shaft 28b so as to rotate smoothly around the stator 28.

The stator base 28a is supported by an upper arm 8a and a lower arm 8b (FIG. 4) that suspend the front wheels of the vehicle 1. In contrast, the rotor body 30a is directly fixed to the wheels of the front wheels 2b (not illustrated). Alternating current converted by the inverters 20a flows through the stator coil 28c and generates a rotational magnetic field. This rotational magnetic field causes an induced current to flow through the rotor coil 30b and generates a driving force that rotates the rotor body 30a. As described above, the driving forces generated by the auxiliary drive motors 20 rotationally drives the wheels of the front wheels 2b (not illustrated) directly.

Figure 10:
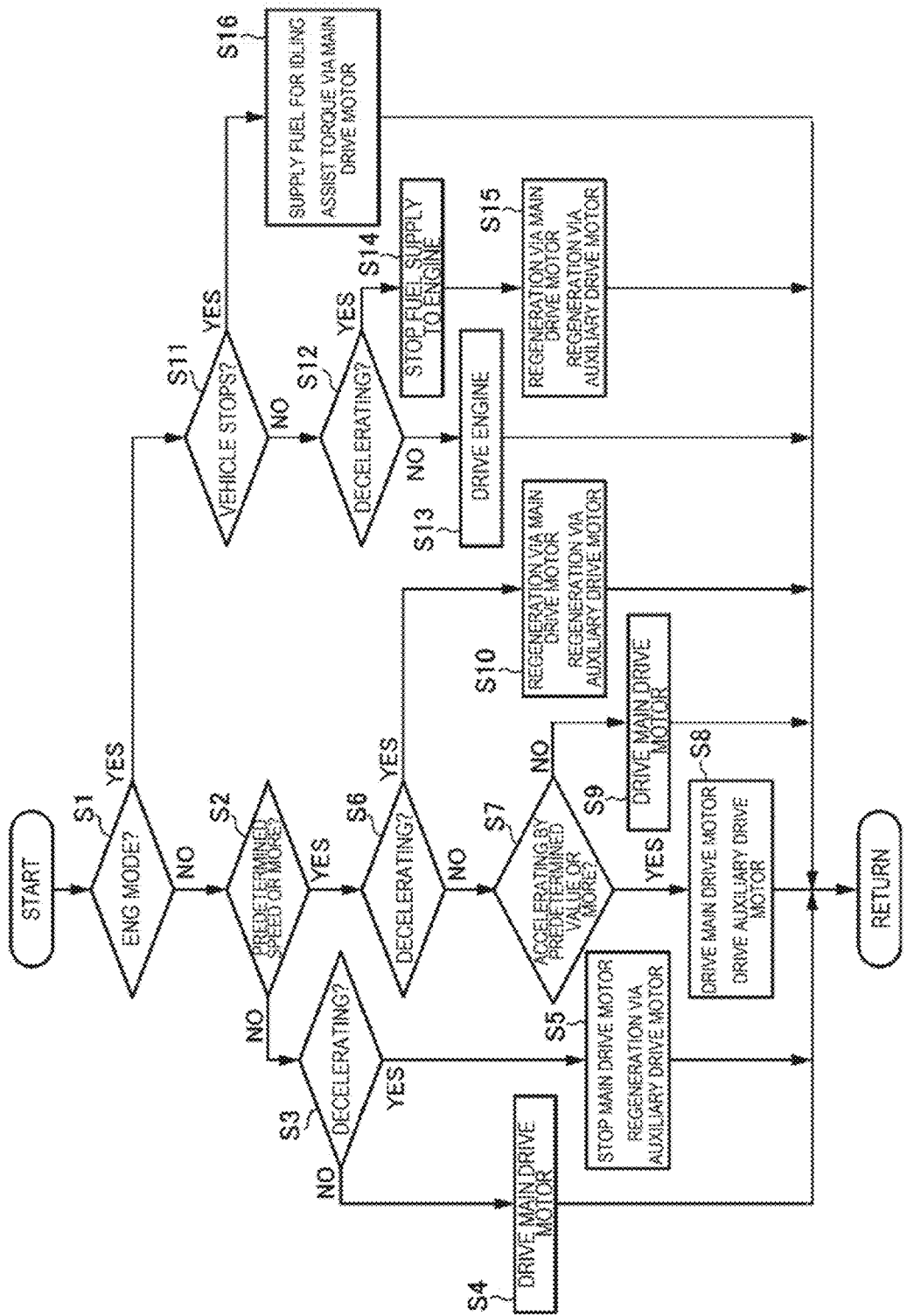
FIG. 10 is a flowchart illustrating control by a control device of the hybrid drive device according to the first embodiment of the present invention.
Figure 11:
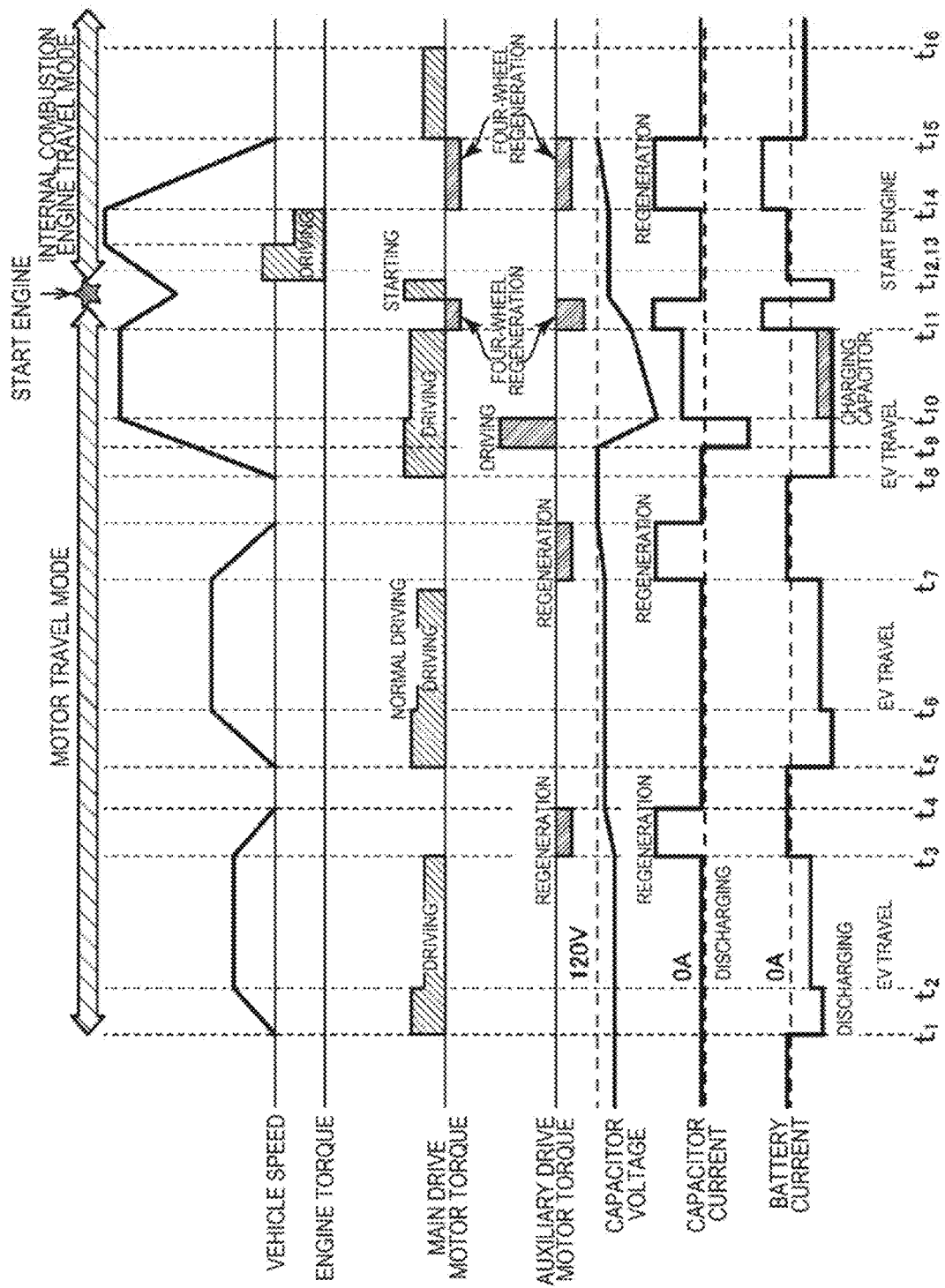
FIG. 11 is a graph illustrating examples of operations in individual modes of the hybrid drive device according to the first embodiment of the present invention.

Next, the operation of the motor travel mode and the operation of the internal combustion engine travel mode performed by the control device 24 will be described with reference to FIG. 10 and FIG. 11. FIG. 10 is a flowchart illustrating control by the control device 24 and FIG. 11 is a graph illustrating examples of the operations of these modes. The flowchart illustrated in FIG. 10 is repeatedly executed at predetermined time intervals while the vehicle 1 operates.

The graph illustrated in FIG. 11 represents, in order from the top, the speed of the vehicle 1, the torque generated by the engine 12, the torque generated by the main drive motor 16, the torque generated by the auxiliary drive motors 20, the voltage of the capacitor 22, the current of the capacitor 22, and the current of the battery 18. In the graph representing the torque of the main drive motor 16 and the torques of the auxiliary drive motors 20, positive values mean the state in which motors generate torques and negative values mean the state in which motors regenerate the kinetic energy of the vehicle 1. In addition, in the graph representing the current of the capacitor 22 and the current of the battery 18, negative values mean the state in which electric power is supplied (discharged) to motors and positive values mean the state of charging with the electric power regenerated by motors.

First, in step S1 in FIG. 10, it is determined whether the vehicle 1 has been set to the internal combustion engine travel mode (ENG mode). That is, the vehicle 1 has the mode selection switch 40 (FIG. 5) that selects either the internal combustion engine travel mode or the motor travel mode (EV mode) and it is determined in step S1 which mode has been set. Since the motor travel mode is set at time $t_1$ in FIG. 11, the processing of the flowchart in FIG. 10 proceeds to step S2.

Next, in step S2, it is determined whether the speed of the vehicle 1 is equal to or more than a predetermined vehicle speed. The processing proceeds to step S6 when the speed is equal to or more than the predetermined vehicle speed or the processing proceeds to step S3 when the speed is less than the predetermined vehicle speed. Since the driver has started the vehicle 1 and the vehicle speed is low at time $t_1$ in FIG. 11, the processing of the flowchart proceeds to step S3.

Furthermore, in step S3, it is determined whether the vehicle 1 is decelerating (whether the brake pedal (not illustrated) of the vehicle 1 is being operated). The processing proceeds to step S5 when the vehicle 1 is decelerating or the processing proceeds to step S4 when the vehicle 1 is accelerating or traveling at a constant speed (when the brake sensor 46 (FIG. 5) does not detect the operation of the brake pedal). Since the driver has started the vehicle 1 and is accelerating the vehicle 1 (accelerator position sensor 44 (FIG. 5) has detected that the accelerator pedal of the vehicle 1 has been operated by a predetermined amount or more) at time $t_1$ in FIG. 11, the processing of the flowchart proceeds to step S4 and the processing of the flowchart in FIG. 10 is completed once. In step S4, the main drive motor 16 generates a torque and the vehicle speed increases (from time $t_1$ to time $t_2$ in FIG. 11). At this time, since discharge current flows from the battery 18 that supplies electric power to the main drive motor 16 and discharge current from the capacitor 22 remains zero because the auxiliary drive motors 20 do not generate torques, the voltage of the capacitor 22 does not change. The current and voltage are detected by the voltage sensor 54 and the current sensor 56 (FIG. 5) and input to the control device 24. In addition, from time $t_1$ to time $t_2$ in FIG. 11, the engine 12 is not driven because the motor travel mode is set. That is, since the control device 24 stops fuel injection via the fuel injection valve 58 of the engine 12 and does not perform ignition via the ignition plug 60, the engine 12 does not generate a torque.

In the example illustrated in FIG. 11, the vehicle 1 accelerates from time $t_1$ to time $t_2$ and then travels at a constant speed until time $t_3$. In this period, the processing of steps S1, S2, S3, and S4 in the flowchart in FIG. 10 is repeatedly executed. During this low speed travel, since the torque generated by the main drive motor 16 becomes smaller than the torque during the acceleration, the current discharged from the battery 18 also becomes smaller.

Next, when the driver operates the brake pedal (not illustrated) of the vehicle 1 at time $t_3$ in FIG. 11, the processing of the flowchart in FIG. 10 proceeds to step S5 from step S3. In step S5, the driving by the main drive motor 16 is stopped (no torque is generated) and the kinetic energy of the vehicle 1 is regenerated as electric power by the auxiliary drive motors 20. The vehicle 1 is decelerated by the regeneration of the kinetic energy, the discharge current from battery 18 becomes zero, the charge current flows through the capacitor 22 because the electric power is regenerated by the auxiliary drive motors 20, and the voltage of the capacitor 22 rises.

When the vehicle 1 stops at time $t_4$ in FIG. 11, the charge current to the capacitor 22 becomes zero and the voltage of the capacitor 22 also becomes constant. Next, the vehicle 1 is started again at time $t_5$ and reaches a constant speed travel (time $t_6$), and the processing of steps S1, S2, S3, and S4 in the flowchart in FIG. 10 is repeatedly executed until the deceleration of the vehicle 1 is started (time $t_7$). When the deceleration of the vehicle is started at time $t_7$, the processing of steps S1, S2, S3, and S5 in the flowchart in FIG. 10 is repeatedly executed and the auxiliary drive motors 20 regenerates electric power. As described above, the motor travel mode is set while the vehicle starts and stops repeatedly at a relatively low speed in urban areas or the like, the vehicle 1 functions purely as an electric vehicle (EV) and the engine 12 does not generate a torque.

Furthermore, when the vehicle 1 is started at time $t_8$ in FIG. 11, the processing of steps S1, S2, S3, and S4 in the flowchart in FIG. 10 is repeatedly executed and the vehicle 1 is accelerated. Next, when the speed of the vehicle 1 detected by the vehicle speed sensor 42 (FIG. 5) exceeds a predetermined first vehicle speed at time $t_9$, the processing of the flowchart proceeds to step S6 from step S2. In step S6, it is determined whether the vehicle 1 is decelerating (the brake pedal is being operated). Since the vehicle 1 is not decelerating at time $t_9$, the processing of the flowchart proceeds to step S7. In step S7, it is determined whether the vehicle 1 is accelerating by a predetermined value or more (whether the accelerator pedal of the vehicle 1 has been operated by a predetermined amount or more). In the embodiment, the predetermined first vehicle speed is set to approximately 100 km/h, which is more than a travel speed of 0 km/h.

Since the vehicle 1 is accelerating by a predetermined value or more at time $t_9$ in the example illustrated in FIG. 11, the processing proceeds to step S8, in which the main drive motor 16 is driven and the auxiliary drive motors 20 are also driven. When the vehicle 1 is accelerated by a predetermined value or more at the predetermined first vehicle speed or more at which the motors are requested for high output power in the motor travel mode as described above, electric power is supplied to the main drive motor 16 and the auxiliary drive motors 20 to obtain the required power, and this drives the vehicle 1. In other words, the control device 24 starts the vehicle 1 (time $t_8$) by causing the main drive motor 16 to generate a driving force and then causes the auxiliary drive motors 20 to generate driving forces when the travel speed of the vehicle 1 detected by the vehicle speed sensor 42 reaches the first vehicle speed (time $t_9$). At this time, the battery 18 supplies electric power to the main drive motor 16 and the capacitor 22 supplies electric power to the auxiliary drive motors 20. Since the capacitor 22 supplies electric power as described above, the voltage of the capacitor 22 drops. While the vehicle 1 is driven by the main drive motor 16 and the auxiliary drive motors 20 (from time $t_9$ to time $t_{10}$), the processing of steps S1, S2, S6, S7, and S8 in the flowchart is repeatedly executed.

As described above, the auxiliary drive motors 20 generate driving forces when the travel speed of the vehicle 1 is equal to or more than the predetermined first vehicle speed and are prohibited from generating driving forces when the travel speed is less than the first vehicle speed. Although the first vehicle speed is set to approximately 100 km/h in the embodiment, the first vehicle speed may be set to any vehicle speed that is equal to or more than approximately 50 km/h according to the output characteristics of the adopted auxiliary drive motors 20. In contrast, the main drive motor 16 generates a driving force when the travel speed of the vehicle 1 is less than a predetermined second vehicle speed including zero or when the travel speed is equal to or more than the second vehicle speed. The predetermined second vehicle speed may be set to a vehicle speed identical to or different from the first vehicle speed. In addition, in the embodiment, the main drive motor 16 always generates a driving force when the driving force is requested in the motor travel mode.

Next, when the vehicle 1 shifts to a constant speed travel (when the accelerator pedal is operated by less than a predetermined amount) at time $t_{10}$ in FIG. 11, the processing of steps S1, S2, S6, S7, and S9 in the flowchart is repeatedly executed. In step S9, driving by the auxiliary drive motors 20 is stopped (no torque is generated) and the vehicle 1 is driven only by the main drive motor 16. Even when the vehicle 1 travels at the predetermined vehicle speed or more, the vehicle 1 is driven only by the main drive motor 16 if the acceleration is less than the predetermined amount.

In addition, since the voltage of the capacitor 22 drops to the predetermined value or less because the capacitor 22 has driven the auxiliary drive motors 20 from time $t_9$ to time $t_{10}$, the control device 24 sends a signal to the high voltage DC/DC converter 26a at time $t_{10}$ to charge the capacitor 22. That is, the high voltage DC/DC converter 26a raises the voltage of the electric charge stored in the battery 18 and charges the capacitor 22. This causes the current for driving the main drive motor 16 and the current for charging the capacitor 22 to be discharged from the battery 18 from time $t_{10}$ to time $t_{11}$ in FIG. 11. If large electric power is regenerated by the auxiliary drive motors 20 and the voltage of the capacitor 22 rises to a predetermined value or more, the control device 24 sends a signal to the high voltage DC/DC converter 26a to reduce the voltage of the capacitor 22 and charges the battery 18. As described above, the electric power regenerated by the auxiliary drive motors 20 is consumed by the auxiliary drive motors 20, or stored in the capacitor 22 and then used to charge the battery 18 via the high voltage DC/DC converter 26a.

When the vehicle 1 decelerates (the brake pedal is operated) at time $t_{11}$ in FIG. 11, the processing of steps S1, S2, S6, and S10 in the flowchart will be repeatedly executed. In step S10, the kinetic energy of the vehicle 1 is regenerated as electric power by both the main drive motor 16 and the auxiliary drive motors 20. The electric power regenerated by the main drive motor 16 is stored in the battery 18 and the electric power regenerated by the auxiliary drive motors 20 is stored in the capacitor 22. As described above, when the brake pedal is operated at the specified vehicle speed or more, electric power is regenerated by both the main drive motor 16 and the auxiliary drive motors 20 and electric charge is stored in the capacitor 22 and the battery 18.

Next, at time $t_{12}$ in FIG. 11, the driver switches the mode of the vehicle 1 from the motor travel mode to the internal combustion engine travel mode by operating the mode selection switch 40 (FIG. 5) and depresses the accelerator pedal (not illustrated). When the mode of the vehicle 1 is switched to the internal combustion engine travel mode, the processing of the flowchart in FIG. 10 by the control device 24 proceeds to step S11 from step S1, and the processing of step S11 and subsequent steps is executed.

First, in step S11, it is determined whether the vehicle 1 stops. When the vehicle 1 does not stop (the vehicle 1 is traveling), it is determined in step S2 whether the vehicle 1 is decelerating (whether the brake pedal (not illustrated) is being operated). Since the vehicle 1 is traveling and the driver is operating the accelerator pedal at time $t_{12}$ in FIG. 11, the processing of the flowchart in FIG. 10 proceeds to step S13.

In step S13, the supply of fuel to the engine 12 starts and the engine 12 generates a torque. That is, since the output shaft (not illustrated) of the engine 12 is directly connected to the output shaft (not illustrated) of the main drive motor 16 in the embodiment, the output shaft of the engine 12 always rotates together with driving by the main drive motor 16. However, the engine 12 does not generate a torque in the motor travel mode because fuel supply to the engine 12 is performed, but, in the internal combustion engine travel mode, the engine 12 generates a torque because fuel supply (fuel injection by the fuel injection valve 58 and ignition by the ignition plug 60) starts.

In addition, immediately after switching from the motor travel mode to the internal combustion engine travel mode, the control device 24 causes the main drive motor 16 to generate a torque for starting the engine (from time $t_{12}$ to time $t_{13}$ in FIG. 11). This torque for starting the engine is generated to cause the vehicle 1 to travel until the engine 12 actually generates a torque after fuel supply to the engine 12 is started and suppress torque fluctuations before and after the engine 12 generates a torque. In addition, in the embodiment, when the number of revolutions of the engine 12 at the time of switching to the internal combustion engine travel mode is less than a predetermined number of revolutions, fuel supply to the engine 12 is not started and the fuel supply is started when the number of revolutions of the engine 12 is equal to or more than the predetermined number of revolutions due to the torque for starting the engine. In the embodiment, when the number of revolutions of the engine 12 detected by the engine RPM sensor 48 rises to 2000 rpm or more, fuel supply is started.

While the vehicle 1 accelerates or travels at a constant speed after the engine 12 is started, the processing of steps S1, S11, S12, and S13 in the flowchart in FIG. 10 is repeatedly executed (from time $t_{13}$ to time $t_{14}$ in FIG. 11). As described above, in the internal combustion engine travel mode, the engine 12 exclusively outputs the power for driving the vehicle 1 and the main drive motor 16 and the auxiliary drive motors 20 do not output the power for driving the vehicle 1. Accordingly, the driver can enjoy the driving feeling of the vehicle 1 driven by the internal combustion engine.

Next, when the driver operates the brake pedal (not illustrated) at time $t_{14}$ in FIG. 11, the processing of the flowchart in FIG. 10 proceeds to step S14 from step S12. In step S14, fuel supply to the engine 12 is stopped and fuel consumption is suppressed. Furthermore, in step S15, the main drive motor 16 and the auxiliary drive motors 20 regenerate the kinetic energy of the vehicle 1 as electric energy and charge current flows through the battery 18 and the capacitor 22. As described above, during deceleration of the vehicle 1, the processing of steps S1, S11, S12, S14, and S15 is repeatedly executed (from time $t_{14}$ to time $t_{15}$ in FIG. 11).

During deceleration of the vehicle 1 in the internal combustion engine travel mode, the control device 24 performs downshift torque adjustment by driving the auxiliary drive motors 20 in switching (shifting) of the transmission 14c, which is a stepped transmission. The torque generated by this torque adjustment complements an instantaneous torque drop or the like and is not equivalent to the torque that drives the vehicle 1. Details on torque adjustment will be described later.

On the other hand, when the vehicle 1 stops at time $t_{15}$ in FIG. 11, the processing of the flowchart in FIG. 10 proceeds to step S16 from step S11. In step S16, the control device 24 supplies the minimum fuel required to maintain the idling of the engine 12. In addition, the control device 24 generates an assist torque via the main drive motor 16 so that the engine 12 can maintain idling at a low number of revolutions. As described above, while the vehicle 1 stops, the processing of steps S1, S11, and S16 is repeatedly executed (from time $t_{15}$ to time $t_{16}$ in FIG. 11).

Although the engine 12 is a flywheel-less engine in the embodiment, since the assist torque generated by the main drive motor 16 acts as a pseudo flywheel, the engine 12 can maintain smooth idling at a low number of revolutions. In addition, adoption of a flywheel-less engine makes the response of the engine 12 high during a travel in the internal combustion engine travel mode, thereby enabling driving with a good feeling.

In addition, when the vehicle 1 starts from a stop state in the internal combustion engine travel mode, the control device 24 increases the number of revolutions of the main drive motor 16 (the number of revolutions of the engine 12) to a predetermined number of revolutions by sending a signal to the main drive motor 16. After the number of revolutions of the engine is increased to the predetermined number of revolutions, the control device 24 supplies the engine 12 with fuel for driving the engine, causes the engine 12 to perform driving, and performs a travel in the internal combustion engine travel mode.

Next, torque adjustment during switching (shifting) of the transmission 14c will be described with reference to FIG. 12.

Figure 12:
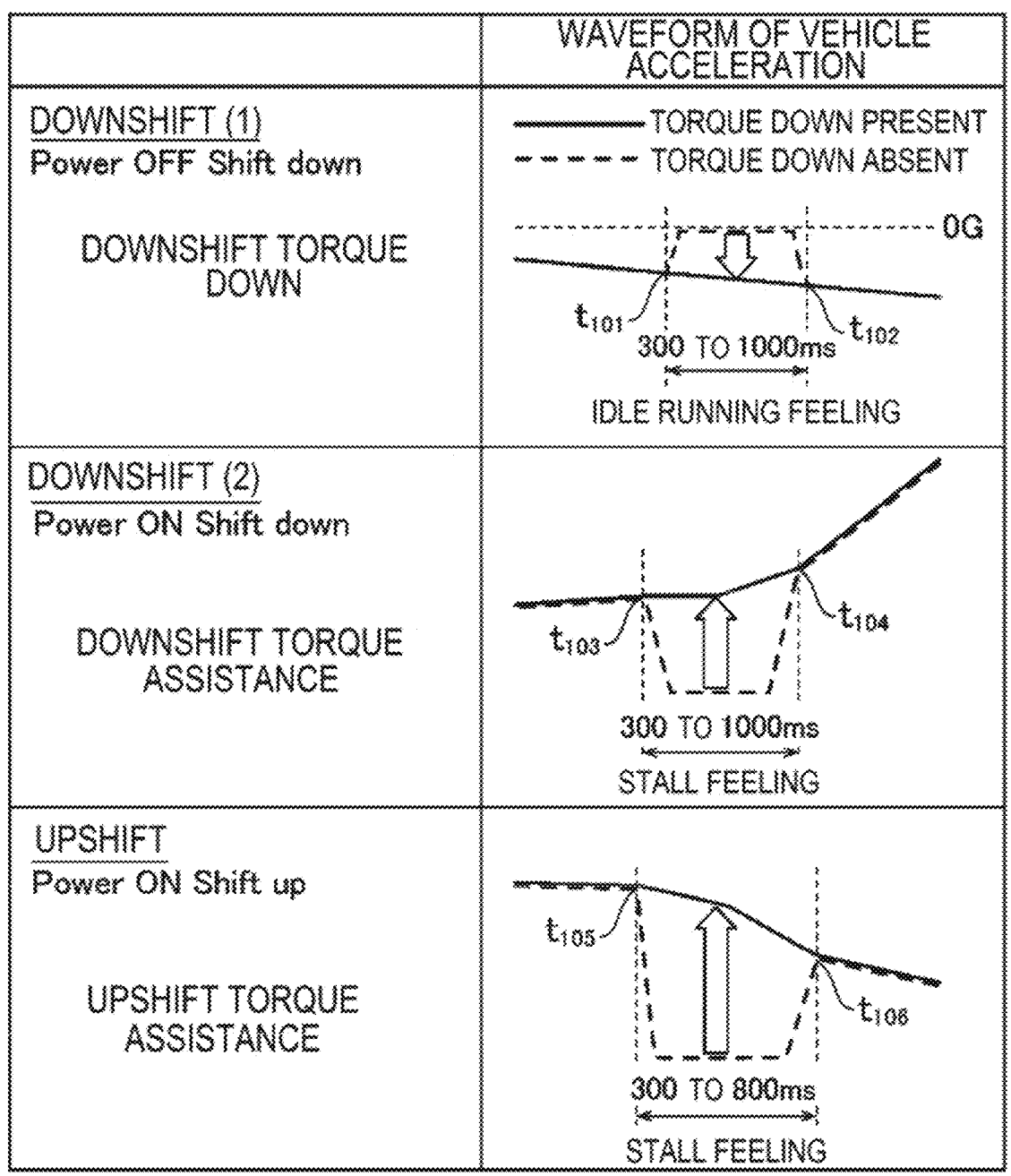
FIG. 12 is a diagram schematically illustrating changes in the acceleration acting on the vehicle when a transmission downshifts or upshifts in the hybrid drive device according to the first embodiment of the present invention.

FIG. 12 is a diagram that schematically illustrates changes in the acceleration that acts on the vehicle when transmission 14c downshifts or upshifts, and represents, in order from the top, examples of downshift torque down, downshift torque assistance, and upshift torque assistance.

In the internal combustion engine travel mode, the hybrid drive device 10 according to the first embodiment of the present invention causes the control device 24 to automatically switch the clutch 14b and the transmission 14c, which is an automatic transmission, according to the vehicle speed and the number of revolutions of the engine when the automatic shift mode is set. As illustrated in the upper part of FIG. 12, when the transmission 14c downshifts (shifts to a low speed) with negative acceleration acting on the vehicle 1 during deceleration (time $t_{101}$ in FIG. 12), the control device 24 disconnects the clutch 14b to disconnect the output shaft of the engine 12 from the main drive wheels (rear wheels 2a). When the engine 12 is disconnected from the main drive wheels in this way, since the rotation resistance of the engine 12 no longer acts on the main drive wheels, the acceleration acting on the vehicle 1 instantaneously changes to a positive side, as indicated by the dotted line in the upper part of FIG. 12. Next, the control device 24 sends a control signal to the transmission 14c and switches the built-in hydraulic solenoid valve 62 (FIG. 5) to increase the reduction ratio of the transmission 14c. Furthermore, when the control device 24 connects the clutch 14b at time $t_{102}$ at which the downshift is completed, the acceleration changes to a negative side again. Although the period from the start to the completion of a downshift (from time $t_{101}$ to time $t_{102}$) is generally 300 to 1000 msec, the occupant is given an idle running feeling and may have a discomfort feeling due to a so-called torque shock in which the torque acting on the vehicle instantaneously changes.

In the hybrid drive device 10 according to the embodiment, the control device 24 makes torque adjustment by sending a control signal to the auxiliary drive motors 20 at the time of a downshift to suppress the idle running feeling of the vehicle 1. Specifically, when the control device 24 performs a downshift by sending a signal to the clutch 14b and the transmission 14c, the control device 24 reads the number of revolutions of the input shaft and the number of revolutions of the output shaft of the transmission 14c detected by the automatic transmission input rotation sensor 50 and the automatic transmission output rotation sensor 52 (FIG. 5), respectively. Furthermore, the control device 24 predicts changes in the acceleration generated in the vehicle 1 based on the number of revolutions of the input shaft and the number of revolutions of the output shaft that have been read and causes the auxiliary drive motors 20 to regenerate energy. This suppresses an instantaneous rise in the acceleration (change to the positive side) of the vehicle 1 due to a torque shock as indicated by the solid line in the upper part of FIG. 12, thereby suppressing an idling running feeling. Furthermore, in the embodiment, the torque shock in the main drive wheels (rear wheels 2a) caused by a downshift is complemented by the auxiliary drive wheels (front wheels 2b) via the auxiliary drive motors 20. Accordingly, torque adjustment can be made without being affected by the dynamic characteristics of the power transmission mechanism 14 that transmits power from the engine 12 to the main drive wheels.

In addition, as indicated by the dotted line in the middle part of FIG. 12, when a downshift is started at time $t_{103}$ with positive acceleration acting on the vehicle 1 during acceleration, the output shaft of the engine 12 is disconnected from the main drive wheels (rear wheels 2a). Accordingly, since the drive torque by the engine 12 does not act on the rear wheels 2a and a torque shock occurs, the occupant may be given a stall feeling by the time the downshift is completed at time $t_{104}$. That is, the acceleration of the vehicle 1 instantaneously changes to the negative side at time $t_{103}$ at which a downshift is started and the acceleration changes to the positive side at time $t_{104}$ at which the downshift is completed.

In the hybrid drive device 10 according to the embodiment, when performing a downshift, the control device 24 predicts changes in the acceleration caused in the vehicle 1 based on detection signals from the automatic transmission input rotation sensor 50 and the automatic transmission output rotation sensor 52 and causes the auxiliary drive motors 20 to generate driving forces. As indicated by the solid line in the middle part of FIG. 12, this suppresses an instantaneous drop (change to the negative side) of the acceleration of the vehicle 1 by a torque shock and suppresses a stall feeling.

Furthermore, as indicated by the dotted line in the lower part of FIG. 12, when an upshift is started at time $t_{105}$ with positive acceleration acting on the vehicle 1 (positive acceleration reduces with time) during acceleration, the output shaft of the engine 12 is disconnected from the main drive wheels (rear wheels 2a). Accordingly, since the drive torque by the engine 12 does not act on the rear wheels 2a and a torque shock occurs, the occupant may be given a stall feeling by the time the upshift is completed at time $t_{106}$. That is, the acceleration of the vehicle 1 instantaneously changes to the negative side at time $t_{105}$ at which the upshift is started and the acceleration changes to the positive side at time $t_{106}$ at which the upshift is completed.

In the embodiment, when performing an upshift, the control device 24 predicts changes in the acceleration caused in the vehicle 1 based on detection signals from the automatic transmission input rotation sensor 50 and the automatic transmission output rotation sensor 52 and causes the auxiliary drive motors 20 to generate driving forces. As indicated by the solid line in the lower part of FIG. 12, this suppresses an instantaneous drop (change to the negative side) of the acceleration of the vehicle 1 due to a torque shock and suppresses a stall feeling.

As described above, the adjustment of the drive torque by the auxiliary drive motors 20 during a downshift or an upshift of the transmission 14c is performed in a very short time and does not substantially drive the vehicle 1. Therefore, the power generated by the auxiliary drive motors 20 can be generated by the electric charge regenerated by the auxiliary drive motors 20 and stored in the capacitor 22. In addition, the adjustment of the drive torque by the auxiliary drive motors 20 can be applied to an automatic transmission with a torque converter, an automatic transmission without a torque converter, an automated manual transmission, and the like.

In the hybrid drive device 10 according to the first embodiment of the present invention, since the wheels (front wheels 2b) are directly driven by the auxiliary drive motors 20 without intervention of a deceleration mechanism (FIG. 4 and FIG. 9), the deceleration mechanism with very heavy weight can be omitted and the output loss due to the rotation resistance of the deceleration mechanism can be avoided.

In addition, in the hybrid drive device 10 according to the embodiment, by adopting induction motors as the in-wheel motors that are the auxiliary drive motors 20 (step S8 in FIG. 10) not requested for a large torque in the low rotation range (FIG. 4 and FIG. 9) in which the requested output power of the driver is small, lightweight motors capable of generating a sufficient torque in the required rotation range can be achieved.

In addition, in the hybrid drive device 10 according to the embodiment, by adopting a permanent magnet motor as the main drive motor 16 requested for a large torque also in the low rotation range (step S4 in FIG. 10) in which the requested output power of the driver is small, a lightweight motor capable of generating a sufficient torque in the required rotation range can be achieved.

Next, a vehicle drive device that is a hybrid drive device according to a second embodiment of the present invention will be described with reference to FIG. 13 and FIG. 14.

The vehicle drive device according to the embodiment is different from that of the first embodiment in the control executed by the control device 24. Accordingly, since the structure of the vehicle drive device described with reference to FIG. 1 to FIG. 9 is the same as that of the first embodiment, the description thereof will be omitted and only the points of the second embodiment of the present invention that are different from those of the first embodiment will be described here.

Figure 13:
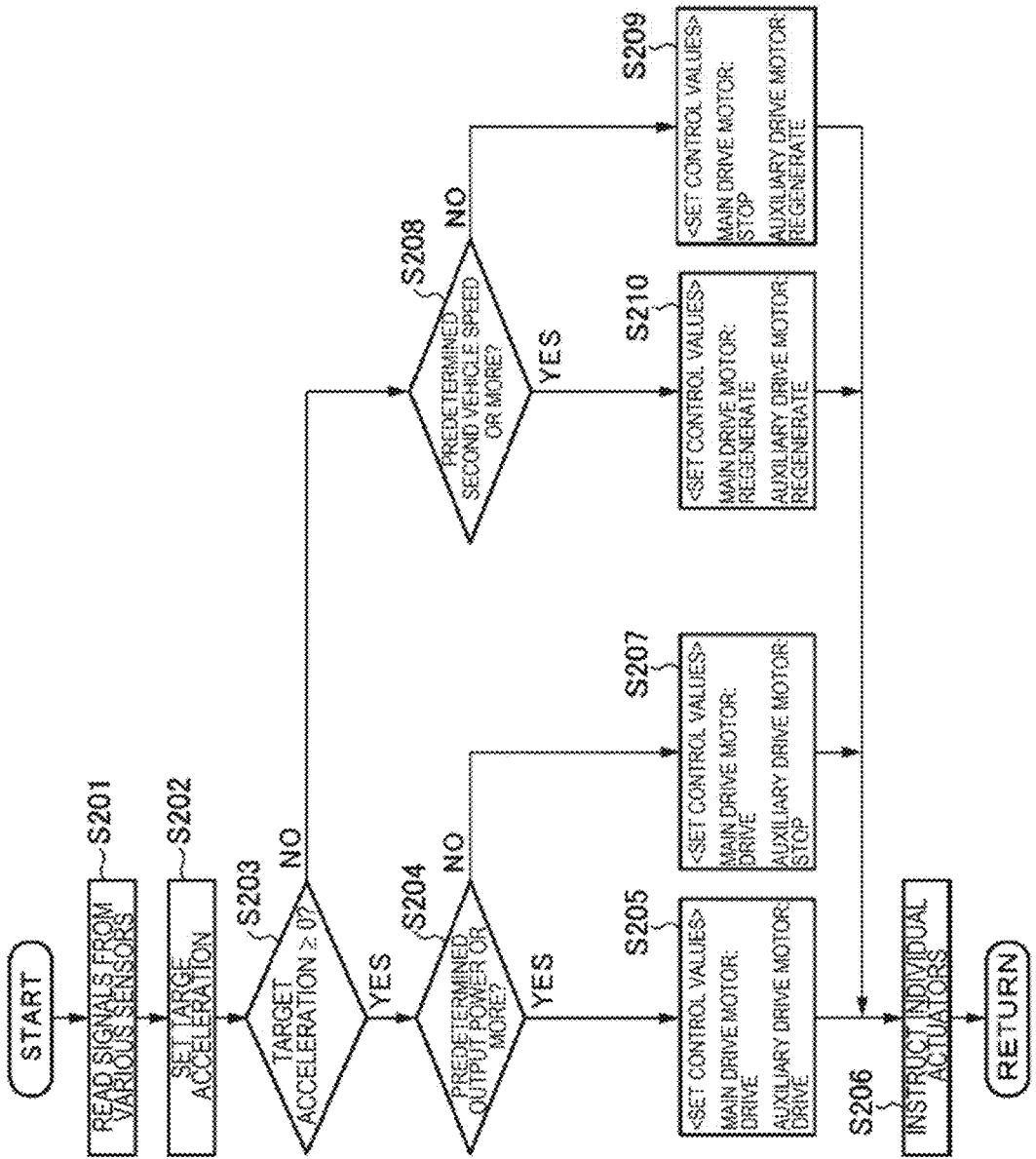
FIG. 13 is a flowchart illustrating control by a control device of a hybrid drive device according to a second embodiment of the present invention.
Figure 14:
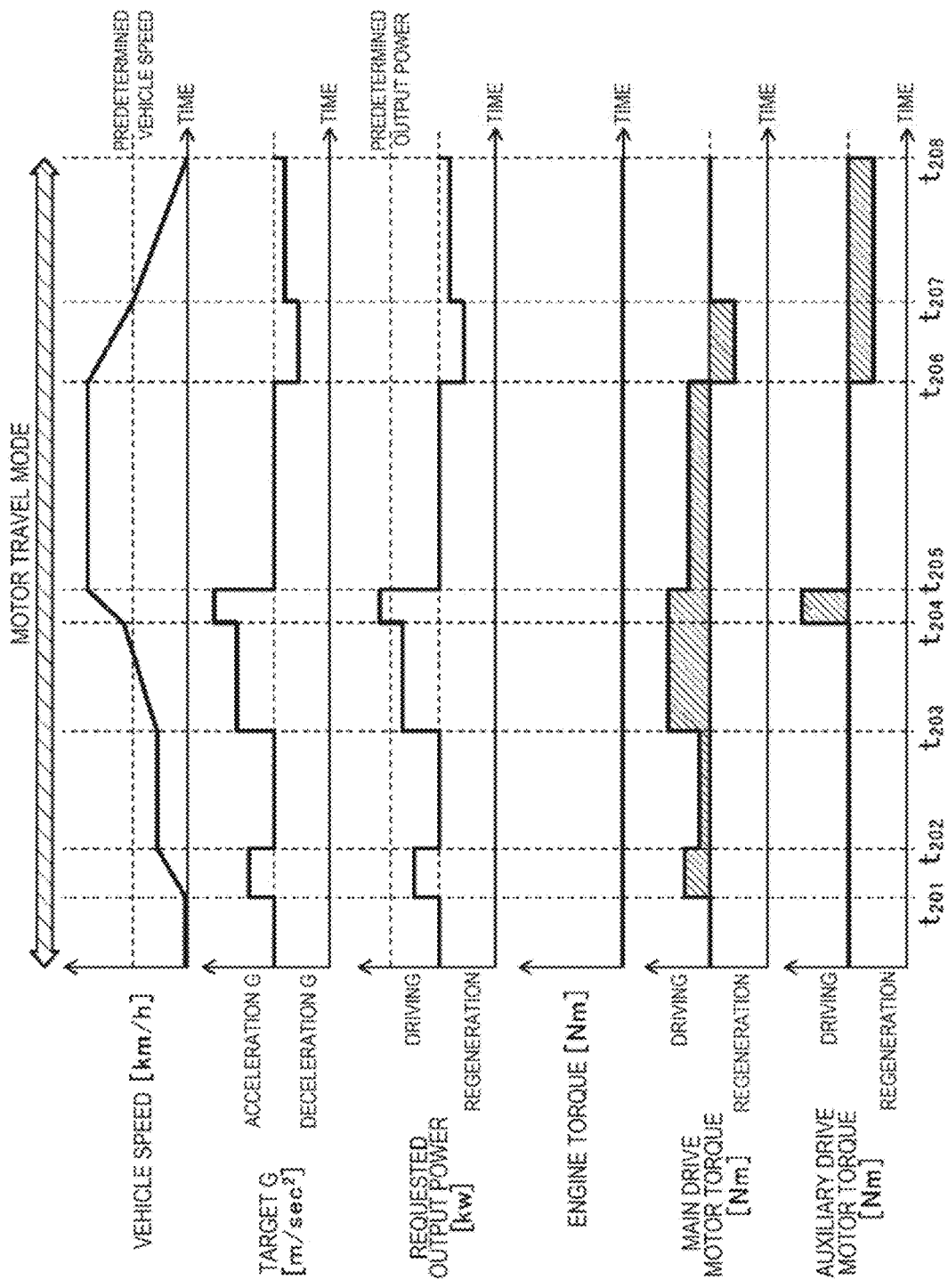
FIG. 14 is a graph illustrating examples of operations in individual modes of the hybrid drive device according to the second embodiment of the present invention.

FIG. 13 is a flowchart illustrating control by the control device installed in the vehicle drive device according to the second embodiment of the present invention and FIG. 14 is a graph illustrating one example of operation in the motor travel mode. The flowchart illustrated in FIG. 13 indicates the processing (corresponding to the processing of step S2 and subsequent steps in the flowchart illustrated in FIG. 10) executed when the mode selection switch 40 of the vehicle 1 is set to the motor travel mode. The processing executed in the engine travel mode of the vehicle control device according to the embodiment is the same as that of the first embodiment. In addition, the flowchart illustrated in FIG. 13 is repeatedly executed at predetermined time intervals while the vehicle 1 operates.

The graph illustrated in FIG. 14 represents, in order from the top, the speed of the vehicle 1, the output requested for the motors to achieve this target acceleration, the target acceleration of the vehicle 1 that is set based on a driving operation by the driver, the torque generated by the engine 12, the torque generated by the main drive motor 16, and the torque generated by the auxiliary drive motors 20. Since the graph illustrated in FIG. 14 represents the operation in the motor travel mode, the torque generated by the engine 12 is always set to zero. In addition, in the graph representing the torque of the main drive motor 16 and the torque of the auxiliary drive motors 20, positive values mean that motors are generating torques and negative values mean that motors are regenerating the kinetic energy of the vehicle 1.

First, in step S201 in FIG. 13, detection signals from various sensors are read. Specifically, detection signals from the vehicle speed sensor 42, the accelerator position sensor 44, the brake sensor 46, and the like are read into the control device 24.

Next, in step S202, the target acceleration is set based on the detection signals from the sensors read in step S201. The target acceleration is set mainly based on the amount of depression of the accelerator pedal (not illustrated) detected by the accelerator position sensor 44 (FIG. 5). In other words, when the driver depresses the accelerator pedal, the target acceleration is set high and the requested output power becomes high, and the requested output power when the amount of depression of the accelerator pedal is large is set higher than the requested output power when the amount of depression of the accelerator pedal is small. In contrast, when the driver depresses the brake pedal (not illustrated) with the intention of decelerating the vehicle 1, the target acceleration is set to a negative value (the target deceleration is set). The target deceleration (negative target acceleration) is set mainly based on the amount of depression of the brake pedal detected by the brake sensor 46 (FIG. 5).

Next, in step S203, it is determined whether the target acceleration set in step S202 is zero or more. The processing proceeds to step S204 when the target acceleration is zero or more (accelerates or travels at a constant speed) or the processing proceeds to step S208 when the target acceleration is less than zero (deceleration). Since the driver has started the vehicle 1 and the vehicle 1 is accelerating at time $t_{201}$ in FIG. 14, the processing of the flowchart proceeds to step S204.

Furthermore, in step S204, it is determined whether the motor output power (requested output power of the driver) required to achieve the target acceleration set in step S202 is equal to or more than the predetermined output power. The processing proceeds to step S207 when the motor output power is less than the predetermined output power or the processing proceeds to step S205 when the motor output power is equal to or more than the predetermined output power. Since the driver has just started the vehicle 1 and the vehicle speed is still low immediately after time $t_{201}$ in FIG. 14, the requested output power is small and the processing of the flowchart proceeds to step S207.

The requested output power is calculated mainly based on the accelerator position (the amount of depression of the accelerator pedal) and the vehicle speed and the requested output power becomes relatively small when the vehicle speed is low. Although the requested output power is estimated based on the vehicle speed and the processing is switched in the first embodiment described above, the processing is directly switched based on the requested output power in the embodiment. In the embodiment, step S205 is executed when the motor output power required to achieve the target acceleration is 25 kW or more.

In step S207, the control parameter for the main drive motor 16 is set so that the target acceleration can be obtained by the driving force of the main drive motor 16. In contrast, in step S207, the control parameter for the auxiliary drive motors 20 is set as to stop the motors (no driving force is generated and no kinetic energy is regenerated). Next, the processing proceeds to step S206, the control parameter set in step S207 is sent from the control device 24 to the main drive motor 16 and the auxiliary drive motors 20, and the processing of the flowchart in FIG. 13 is completed once. By receiving the control parameter in step S206, the main drive motor 16 generates a torque, increases the vehicle speed, and achieves the target acceleration (from time $t_{201}$ to time $t_{202}$ in FIG. 14).

In the example illustrated in FIG. 14, the vehicle 1 is accelerated from time $t_{201}$ to time $t_{202}$. In this period, the processing of steps S201, S202, S203, S204, S207, and S206 in the flowchart in FIG. 13 is repeatedly executed.

Next, when the driver releases the accelerator pedal at time $t_{202}$ in FIG. 14, the target acceleration to be set in step S202 in FIG. 13 becomes zero (constant speed travel). Also in this state, the processing of the flowchart in FIG. 13 proceeds to step S204 and then step 207 from step S203. In this state, in step S207, the control parameter for the main drive motor 16 is set so that a constant speed travel is maintained by the driving force of the main drive motor 16. That is, the control parameter is set so that the main drive motor 16 generates a driving force corresponding to the travel resistance of the vehicle 1 and maintains a constant speed. Accordingly, the driving force generated by the main drive motor 16 becomes smaller than the driving force during acceleration of the vehicle 1. In contrast, in step S207, the control parameter for the auxiliary drive motors 20 is set so as to stop the motors. Next, the processing proceeds to step S206, the control parameters set in step S207 are sent to the individual motors, and the processing of the flowchart in FIG. 13 is completed once.

In the example illustrated in FIG. 14, the vehicle 1 travels at a constant speed from time $t_{202}$ to time $t_{203}$. In this period, the processing of steps S201, S202, S203, S204, S207, and S206 in the flowchart in FIG. 13 is repeatedly executed.

Next, when the driver depresses the accelerator pedal again at time $t_{203}$ in FIG. 14, the target acceleration to be set in step S202 in FIG. 13 becomes a positive value. Still in this state, in step S207 in FIG. 13, the control parameter for the main drive motor 16 is set so that the set target acceleration is achieved and the control parameter for the auxiliary drive motors 20 is set so as to stop the motors. In the example illustrated in FIG. 14, the vehicle 1 travels at a constant acceleration from time $t_{203}$ to time $t_{204}$ and the speed thereof increases.

Next, when the driver further depresses the accelerator pedal at time $t_{204}$ and it is determined in step S204 that the requested output power is equal to or more than predetermined output power (for example, 25 kW), the processing of the flowchart in FIG. 13 proceeds to step S205 from step S204. In step S205, the control parameters for the main drive motor 16 and the auxiliary drive motors 20 are set so that the target acceleration can be obtained by the driving forces of the main drive motor 16 and the auxiliary drive motors 20. That is, the control parameters are set so that the sum of the output power of the main drive motor 16 and the output power of the auxiliary drive motors 20 equals the requested output power.

As described above, in the embodiment, the control device 24 causes the main drive motor 16 to generate a driving force and the auxiliary drive motors 20 not to generate driving forces when the requested output power of the driver is less than the predetermined output power. When the requested output power of the driver is equal to or more than the predetermined output power, the control device 24 causes the main drive motor 16 and the auxiliary drive motors 20 to generate driving forces. That is, the target acceleration set in step S202 is achieved by the driving forces generated by the main drive motor 16 and the auxiliary drive motors 20. In the example illustrated in FIG. 14, when the driver depresses the accelerator pedal, the target acceleration increases, the requested output power exceeds the predetermined output power, and the auxiliary drive motors 20 also generate driving forces. However, since the requested output power also increases due to an increase in the vehicle speed, the driving by the auxiliary drive motors 20 may start because the requested output power exceeds the predetermined output power when the vehicles travels at a certain target acceleration.

In the example illustrated in FIG. 14, the vehicle 1 travels at a constant acceleration from time $t_{204}$ to time $t_{205}$ and the speed thereof increases. In this period, the processing of steps S201, S202, S203, S204, S205, and S206 in the flowchart in FIG. 13 is repeatedly executed.

Next, when the driver releases the accelerator pedal at time $t_{205}$ in FIG. 14, the target acceleration to be set in step S202 in FIG. 13 becomes zero (constant speed travel). This causes the processing of the flowchart in FIG. 13 to proceed to step S207 from step S204 again and the processing of steps S201, S202, S203, S204, S207, and S206 is repeatedly executed. In step S207, the control parameter for the main drive motor 16 is set so that a constant speed travel is maintained by the driving force of the main drive motor 16. Next, the processing proceeds to step S206, the control parameters set in step S207 are sent to the individual motors and the processing of the flowchart in FIG. 13 is completed once. It should be noted here that the present invention may be configured so that a constant speed travel is maintained only by the driving forces of the auxiliary drive motors 20 during a high speed travel.

Next, when the driver operates the brake pedal (not illustrated) of the vehicle 1 at time $t_{206}$ in FIG. 14, the target acceleration to be set in step S202 of the flowchart in FIG. 13 becomes a negative value (target deceleration). This causes the processing of the flowchart to proceed to step S208 from step S203.

In step S208, it is determined whether the vehicle speed detected by the vehicle speed sensor 42 is equal to or more than the predetermined second vehicle speed. Since the vehicle speed is high immediately after time $t_{206}$ in FIG. 14, the processing of the flowchart proceeds to step S210 from step S208. This causes the processing of steps S201, S202, S203, S208, S210, and S206 to be repeatedly executed. Although the predetermined second vehicle speed is set to 100 km/h in the embodiment, the predetermined second vehicle speed may be set to any vehicle speed equal to or more than 50 km/h.

In step S210, the control parameters for the main drive motor 16 and the auxiliary drive motors 20 are set so that these motors regenerate the kinetic energy of the vehicle 1. Furthermore, when the set control parameters are sent to the main drive motor 16 and the auxiliary drive motors 20 in step S206, the kinetic energy is regenerated by these motors.

When the vehicle speed is reduced by an operation of the brake pedal (not illustrated) by the driver and the speed of the vehicle 1 becomes less than the predetermined second vehicle speed (100 km/h in the embodiment) at time $t_{207}$ in FIG. 14, the processing of the flowchart proceeds to step S209 from step S208 and the processing of steps S201, S202, S203, S209, and S206 is repeatedly executed. In step S209, the control parameters for the main drive motor 16 and the auxiliary drive motors 20 are set so that the main drive motor 16 stops (no driving force is generated and no kinetic energy is regenerated) and the auxiliary drive motors 20 regenerate the kinetic energy of the vehicle 1. In addition, when the set control parameters are sent to the main drive motor 16 and the auxiliary drive motors 20 in step S206, the kinetic energy is regenerated by the auxiliary drive motors 20. This reduces the vehicle speed and the vehicle 1 stops at time $t_{208}$ in FIG. 14.

In the vehicle drive device according to the second embodiment of the present invention, since the main drive motor 16, which is the body side motor, and the in-while motors, which are the auxiliary drive motors 20, generate driving forces (step S205 in FIG. 13) when the requested output power of the driver is equal to or more than the predetermined output power (from step S204 to step S205 in FIG. 13), the in-wheel motors are not requested for large output power. As a result, since small motors with small output power may be adopted as the in-wheel motors, the vehicle can be efficiently driven using the in-wheel motors. It should be noted here that the vehicle drive device according to the first embodiment of the present invention has the same effect.

In the vehicle drive device according to the embodiment, since the requested output power of the driver is set based on the amount of depression of the accelerator pedal detected by the accelerator position sensor 44 (steps S201 and S202 in FIG. 13) and the requested output power of the driver is set to a large value when the amount of depression of the accelerator pedal is large, the intention of the driver can be more accurately reflected in the requested output power.

The vehicle drive devices according to the first and second embodiments of the present invention have been described above. Although the vehicle drive device according to the present invention is applied to an FR (front engine/rear drive) vehicle in any of the first and second embodiments described above, the present invention is also applicable to various types of vehicles such as a so-called FF (front engine/front drive) vehicle in which an engine and/or a main drive motor are disposed in the front portion of the vehicle and the front wheels are the main drive wheels or a so-called RR (rear engine/rear drive) vehicle in which an engine and/or a main drive motor are disposed in the rear portion of the vehicle and the rear wheels are the main drive wheels.

Figure 15:
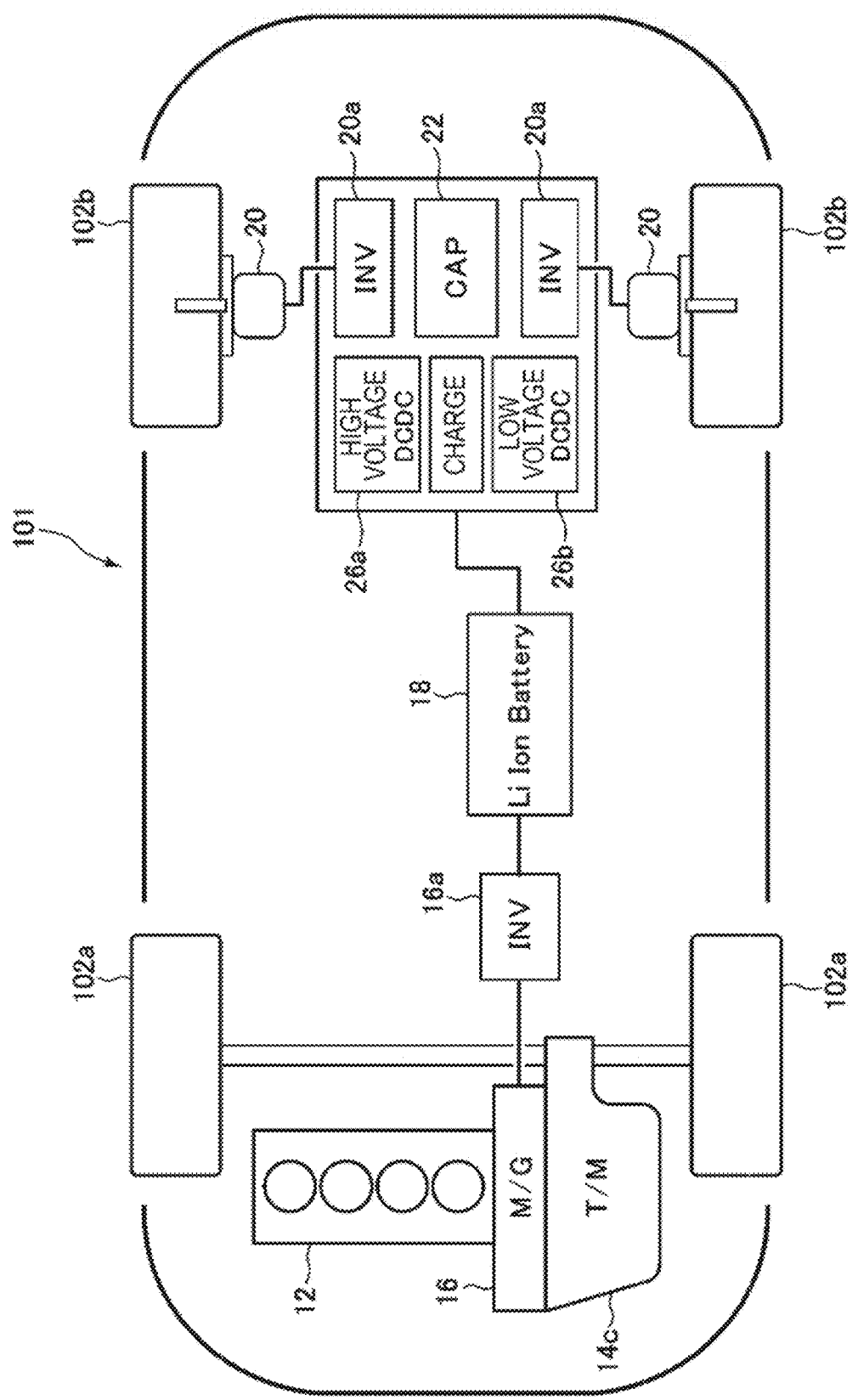
FIG. 15 is a layout diagram illustrating a vehicle in which a hybrid drive device according to a first modification of the present invention is installed.

When the present invention is applied to an FF vehicle, it is possible to adopt a layout in which, for example, the engine 12, the main drive motor 16, and the transmission 14c are disposed in the front portion of a vehicle 101 and front wheels 102a are driven as the main drive wheels, as illustrated in FIG. 15. In addition, the auxiliary drive motors 20 can be disposed as in-wheel motors in the left and right rear wheels 102b, which are the auxiliary drive wheels. As described above, the present invention can be configured so that the main drive motor 16, which is the body side motor, drives the front wheels 102a, which are the main drive wheels, and the auxiliary drive motors 20, which are the in-wheel motors, drive the rear wheels 102b, which are the auxiliary drive wheels. In this layout, the main drive motor 16 can be driven by the electric power supplied via the inverter 16a and stored in the battery 18. In addition, an integrated unit formed by integrating the capacitor 22, the high voltage DC/DC converter 26a and the low voltage DC/DC converter 26b, which are voltage converting units, and the two inverters 20a can be disposed in the rear portion of the vehicle 101. Furthermore, the auxiliary drive motors 20 can be driven by the electric power supplied via the inverters 20a and stored in the battery 18 and the capacitor 22 that are disposed in series.

Figure 16:
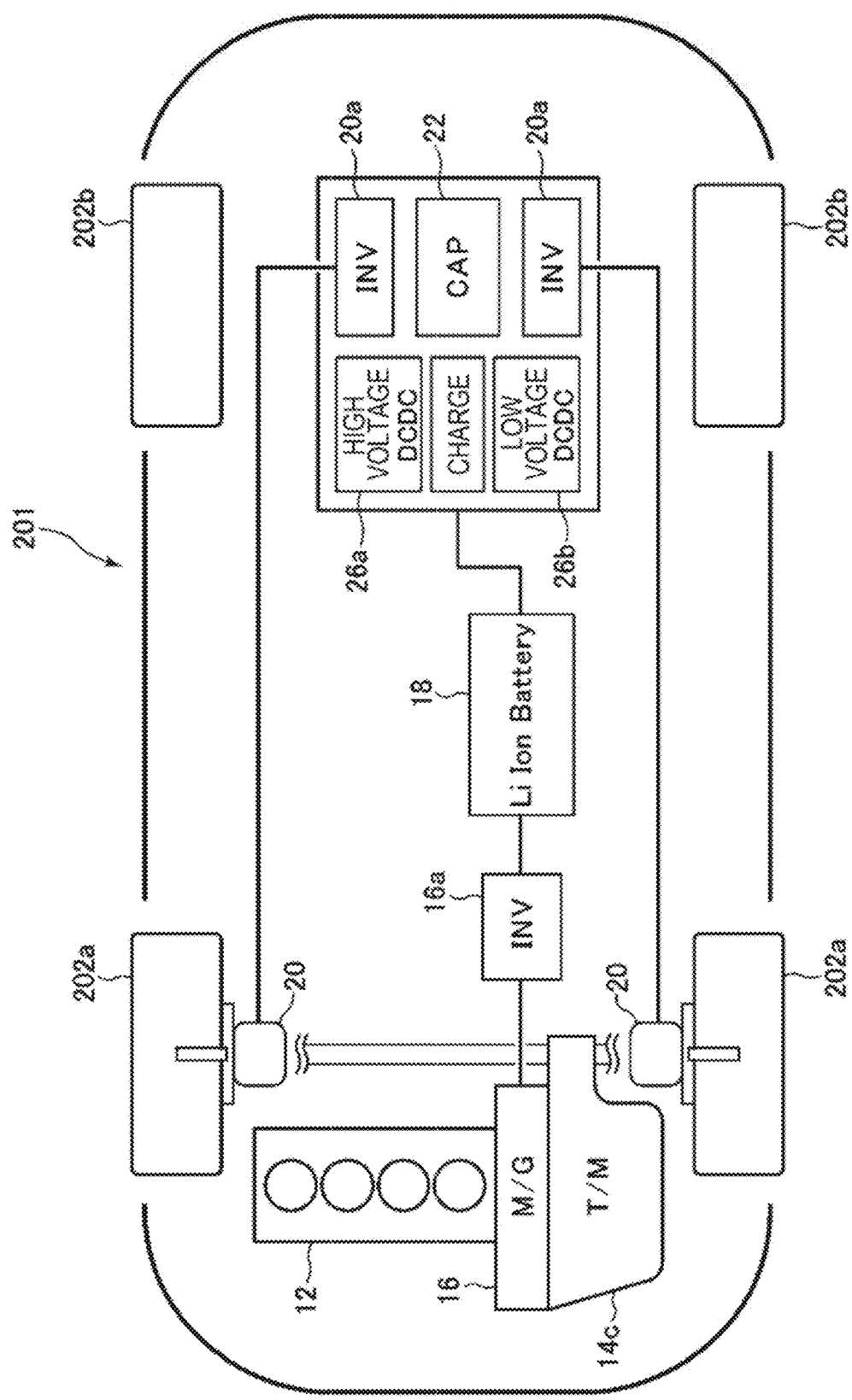
FIG. 16 is a layout diagram illustrating a vehicle in which a hybrid drive device according to a second modification of the present invention is installed.

When the present invention is applied to an FF vehicle, it is possible to adopt a layout in which, for example, the engine 12, the main drive motor 16, and the transmission 14c are disposed in the front portion of a vehicle 201, and the front wheels 202a are driven as the main drive wheels, as illustrated in FIG. 16. In addition, the auxiliary drive motors 20 can be disposed as in-wheel motors in the left and right front wheels 202a, which are the main drive wheels. As described above, the present invention can be configured so that the main drive motor 16, which is the body side motor, drives the front wheels 202a, which are the main drive wheels, and the auxiliary drive motors 20, which are the in-wheel motors, also drive the front wheels 202a, which are the main drive wheels. In this layout, the main drive motor 16 can be driven by the electric power supplied via the inverter 16a and stored in the battery 18. In addition, an integrated unit formed by integrating the capacitor 22, the high voltage DC/DC converter 26a and the low voltage DC/DC converter 26b, which are voltage converting units, and the two inverters 20a can be disposed in the rear portion of the vehicle 201. Furthermore, the auxiliary drive motors 20 can be driven by the electric power supplied via the inverters 20a and stored in the battery 18 and the capacitor 22 that are disposed in series.

Figure 17:
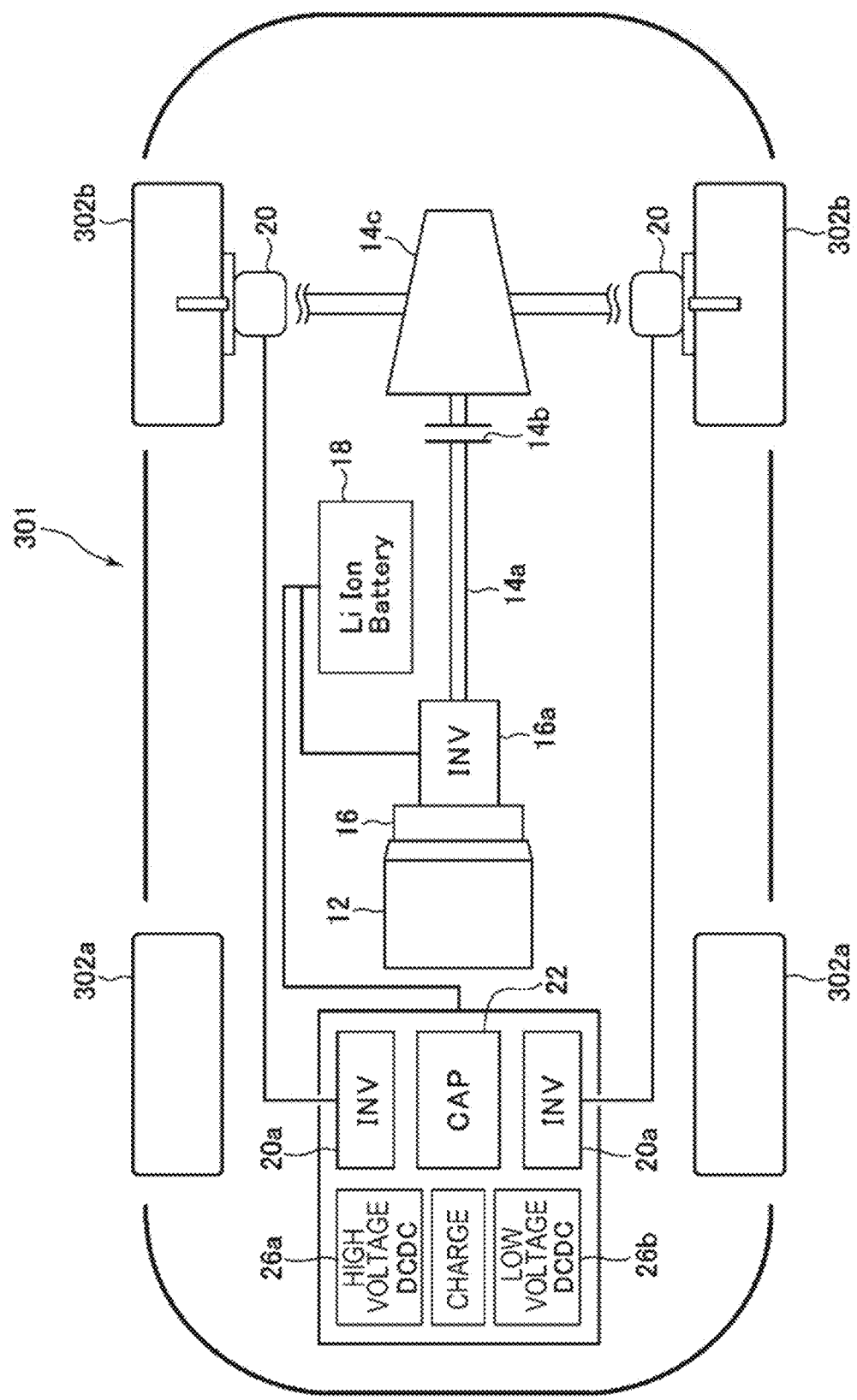
FIG. 17 is a layout diagram illustrating a vehicle in which a hybrid drive device according to a third modification of the present invention is installed.

In contrast, when the present invention is applied to an FR vehicle, it is possible to adopt a layout in which, for example, the engine 12 and the main drive motor 16 are disposed in the front portion of a vehicle 301 and rear wheels 302b are driven as the main drive wheels by leading electric power to the rear portion of the vehicle 301 via the propeller shaft 14a, as illustrated in FIG. 17. The rear wheels 302b are driven by the power led to the rear portion by the propeller shaft 14a via the clutch 14b and the transmission 14c, which is a stepped transmission. In addition, the auxiliary drive motors 20 can be disposed as in-wheel motors in the left and right rear wheels 302b, which are the main drive wheels. As described above, the present invention can be configured so that the main drive motor 16, which is the body side motor, drives the rear wheels 302b, which are the main drive wheels, and the auxiliary drive motors 20, which are the in-wheel motors, also drive the rear wheels 302b, which are the main drive wheels. In this layout, the main drive motor 16 can be driven by the electric power supplied via the inverter 16a and stored in the battery 18. In addition, an integrated unit formed by integrating the capacitor 22, the high voltage DC/DC converter 26a and the low voltage DC/DC converter 26b, which are voltage converting units, and the two inverters 20a can be disposed in the front portion of the vehicle 301. Furthermore, the auxiliary drive motors 20 can be driven by the electric power supplied via the inverters 20a and stored in the battery 18 and the capacitor 22 that are disposed in series.

Although preferred embodiments of the present invention have been described above, various modifications can be made to the embodiments described above. In particular, the present invention is applied to a hybrid drive device including an engine and a motor in the embodiments described above, but the present invention is applicable to a vehicle drive device that drives a vehicle only by a motor without having an engine.

REFERENCE SIGNS LIST

1: vehicle
2a: rear wheel (main drive wheel)
2b: front wheel (auxiliary drive wheel)
4a: subframe
4b: front side frame
4c: dash panel
4d: propeller shaft tunnel
6a: engine mount
6b: capacitor mount
8a: upper arm
8b: lower arm
8c: spring
8d: shock absorber
10: hybrid drive device (vehicle drive device)
12: engine (internal combustion engine)
14: power transmission mechanism
14a: propeller shaft
14b: clutch
14c: transmission (stepped transmission, automatic transmission)
14d: torque tube
16: main drive motor (main drive electric motor, body side motor)
16a: inverter
18: battery (electric storage unit)
20: auxiliary drive motor (auxiliary drive electric motor, in-wheel motor)
20a inverter
22: capacitor
22a: bracket
22b: harness
24: control device (controller)
25: electrical component
26a: high voltage DC/DC converter (voltage converting unit)
26b: low voltage DC/DC converter
28: stator
28a: stator base
28b: stator shaft
28c: stator coil
30: rotor
30a: rotor body
30b: rotor coil
32: electrical insulating liquid chamber
32a: electrical insulating liquid
34: bearing
40: mode selection switch
42: vehicle speed sensor
44: accelerator position sensor
46: brake sensor
48: engine RPM sensor
50: automatic transmission input rotation sensor
52: automatic transmission output rotation sensor
54: voltage sensor
56: current sensor
58: fuel injection valve
60: spark plug
62: hydraulic solenoid valve
101: vehicle
102a: front wheel (main drive wheel)
102b: rear wheel (auxiliary drive wheel)
201: vehicle
202a: front wheel (main drive wheel)
301: vehicle
302b: rear wheel (main drive wheel)

The invention claimed is:

1. A vehicle drive device comprising:
an in-wheel motor provided in a wheel of a vehicle, the wheel being located outside of a body of the vehicle, the in-wheel motor configured to drive the wheel;
a body side motor provided in the body of the vehicle and configured to drive the wheel of the vehicle or another wheel of the vehicle via a drive shaft that is connected to a combustion engine of the vehicle; and
a controller that controls the in-wheel motor and the body side motor,
wherein the controller is configured to:
determine whether or not a target acceleration is greater than or equal to zero;
upon determining that the target acceleration is greater than or equal to zero:
when a requested output power of the driver is less than a predetermined output power, control the body side motor to generate a body side motor driving force and the in-wheel motor not to generate an in-wheel motor driving force, and
when the requested output power of the driver is equal to or more than the predetermined output power, control the body side motor to generate the body side motor driving force and the in-wheel motor to generate the in-wheel motor driving force; and
upon determining that the target acceleration is less than zero:
when a speed of the vehicle is less than a predetermined speed threshold, control the body side motor not to generate a body side motor regenerative energy and the in-wheel motor to generate an in-wheel motor regenerative energy, and
when the speed of the vehicle is equal to or greater than the predetermined speed threshold, control the body side motor to generate the body side motor regenerative energy and the in-wheel motor to generate the in-wheel motor regenerative energy.

2. The vehicle drive device according to claim 1, further comprising:
an accelerator position sensor that detects an amount of depression of an accelerator pedal of the vehicle,
wherein the controller sets the requested output power of the driver based on the amount of depression of the accelerator pedal detected by the accelerator position sensor, and
when the amount of depression of the accelerator pedal is larger than an accelerator depression threshold, the requested output power of the driver is set to a first output power that is larger than a second output power corresponding to when the amount of depression of the accelerator pedal is smaller than the accelerator depression threshold; and a brake position sensor that detects a depression of a brake pedal of the vehicle, wherein the controller sets the target acceleration to be less than zero based on the depression of the accelerator pedal detected by the brake position sensor.

3. The vehicle drive device according to claim 1, wherein the in-wheel motor is an induction motor.

4. The vehicle drive device according to claim 1, wherein the body side motor is a permanent magnet motor.

5. The vehicle drive device according to claim 1, wherein the wheel driven by the in-wheel motor is a front wheel of the vehicle and the wheel driven by the body side motor is a rear wheel of the vehicle.

6. The vehicle drive device according to claim 1, wherein the wheel driven by the in-wheel motor is a rear wheel of the vehicle and the wheel driven by the body side motor is a front wheel of the vehicle.

7. The vehicle drive device according to claim 1, wherein the wheel driven by the in-wheel motor and the body side motor is a front wheel of the vehicle.

8. The vehicle drive device according to claim 1, wherein the wheel driven by the in-wheel motor and the body side motor is a rear wheel of the vehicle.

\* \* \* \* \*